(12) United States Patent
Zhou et al.

(10) Patent No.: US 12,461,430 B2
(45) Date of Patent: Nov. 4, 2025

(54) OPTICAL IMAGING LENS GROUP

(71) Applicant: Zhejiang Sunny Optics Co., Ltd, Yuyao (CN)

(72) Inventors: Qionghua Zhou, Yuyao (CN); Yuhao Wang, Yuyao (CN); Yanping Li, Yuyao (CN); Lingbo He, Yuyao (CN); Lin Huang, Yuyao (CN); Fujian Dai, Yuyao (CN); Liefeng Zhao, Yuyao (CN)

(73) Assignee: Zhejiang Sunny Optics Co., Ltd (CN)

( * ) Notice: Subject to any disclaimer, the term of this patent is extended or adjusted under 35 U.S.C. 154(b) by 697 days.

(21) Appl. No.: 17/560,240

(22) Filed: Dec. 22, 2021

(65) Prior Publication Data

US 2022/0236627 A1  Jul. 28, 2022

(30) Foreign Application Priority Data

Jan. 25, 2021 (CN) .......................... 202110096278.3

(51) Int. Cl.
| | |
|---|---|
| *G03B 13/36* | (2021.01) |
| *G02B 9/62* | (2006.01) |
| *G02B 9/64* | (2006.01) |
| *G02B 13/00* | (2006.01) |
| *G02B 26/00* | (2006.01) |
| *G02B 9/60* | (2006.01) |

(52) U.S. Cl.
CPC ............... *G03B 13/36* (2013.01); *G02B 9/62* (2013.01); *G02B 9/64* (2013.01); *G02B 13/0045* (2013.01); *G02B 13/0075* (2013.01); *G02B 26/004* (2013.01); *G02B 9/60* (2013.01)

(58) Field of Classification Search
CPC .. G03B 13/36; G02B 13/0045; G02B 26/004; G02B 9/60; G02B 13/18; G02B 27/0012; G02B 13/12; G02B 13/0075; G02B 9/62; G02B 9/64
USPC ........................................................ 359/763
See application file for complete search history.

(56) References Cited

U.S. PATENT DOCUMENTS

2021/0048629 A1 * 2/2021 Kuo ..................... G02B 26/004

FOREIGN PATENT DOCUMENTS

| CN | 110850583 A | * | 2/2020 | |
|---|---|---|---|---|
| TW | I701474 B | | 8/2020 | |
| TW | I704389 B | | 9/2020 | |
| WO | WO-2020080053 A1 | * | 4/2020 | ......... G02B 13/0045 |

OTHER PUBLICATIONS

Gross et al. "Handbook of Optical Systems vol. 3: Aberration Theory and Correction of Optical Systems" Weinheim Germany, WILEY-VCH Verlag GmbH & Co. KGaA, pp. 377-379 (Year: 2007).*

* cited by examiner

*Primary Examiner* — William R Alexander
*Assistant Examiner* — Alaina Marie Swanson
(74) *Attorney, Agent, or Firm* — Barnes & Thornburg

(57) ABSTRACT

An optical imaging lens group, along an optical axis from an object side to an image side, sequentially includes: an autofocus component, a first lens, a second lens, a third lens, a fourth lens, and at least one subsequent lens. A radius of curvature of an image-side surface of the autofocus component is variable; and there is an interval between each two adjacent lenses among the first lens to the at least one subsequent lens.

17 Claims, 28 Drawing Sheets

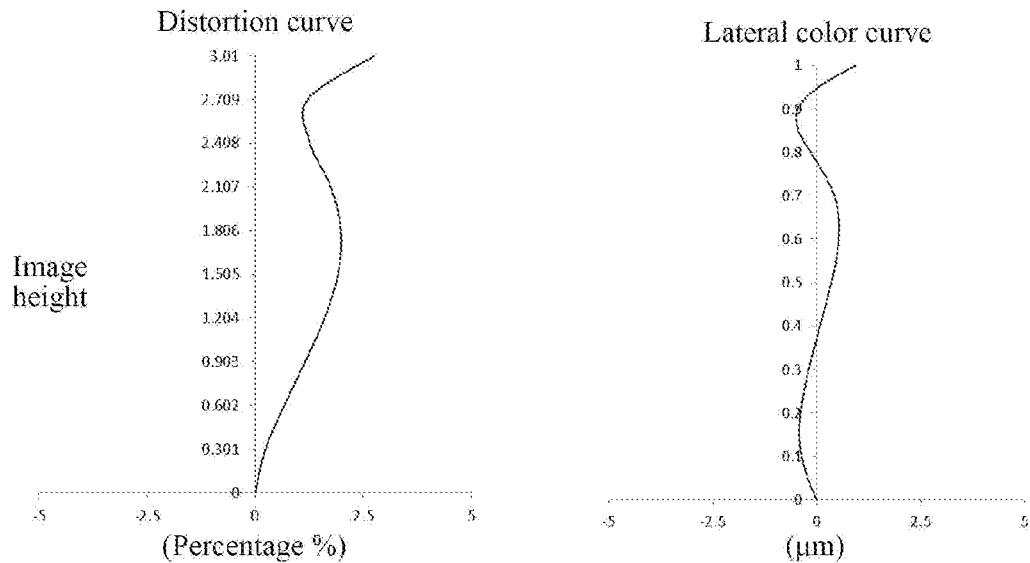
Fig. 2C
Fig. 2D
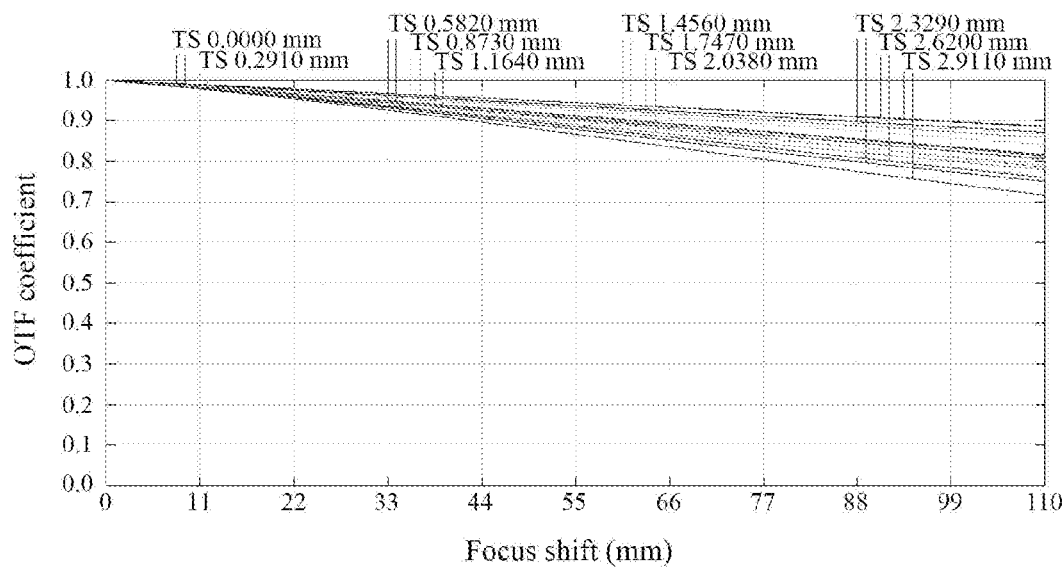
Fig. 3A

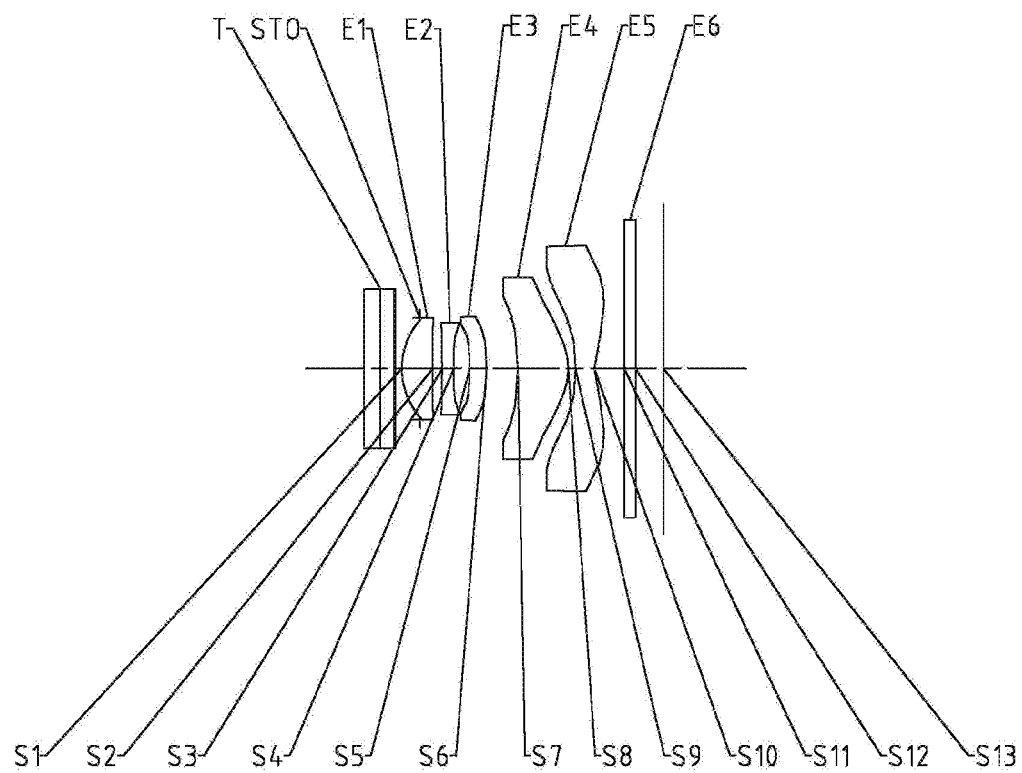
Fig. 11
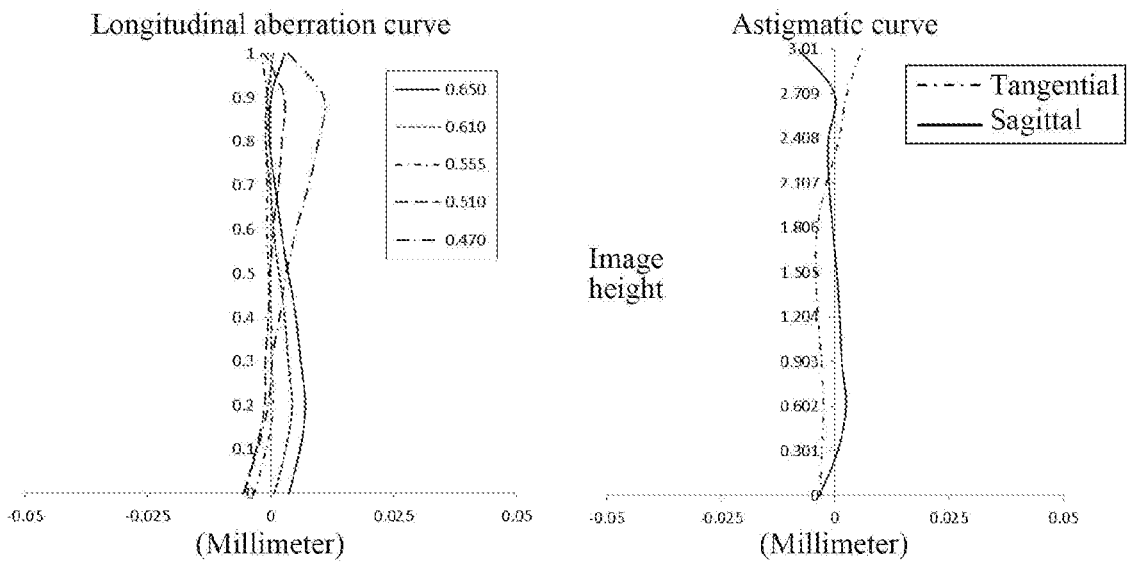
Fig. 12A
Fig. 12B

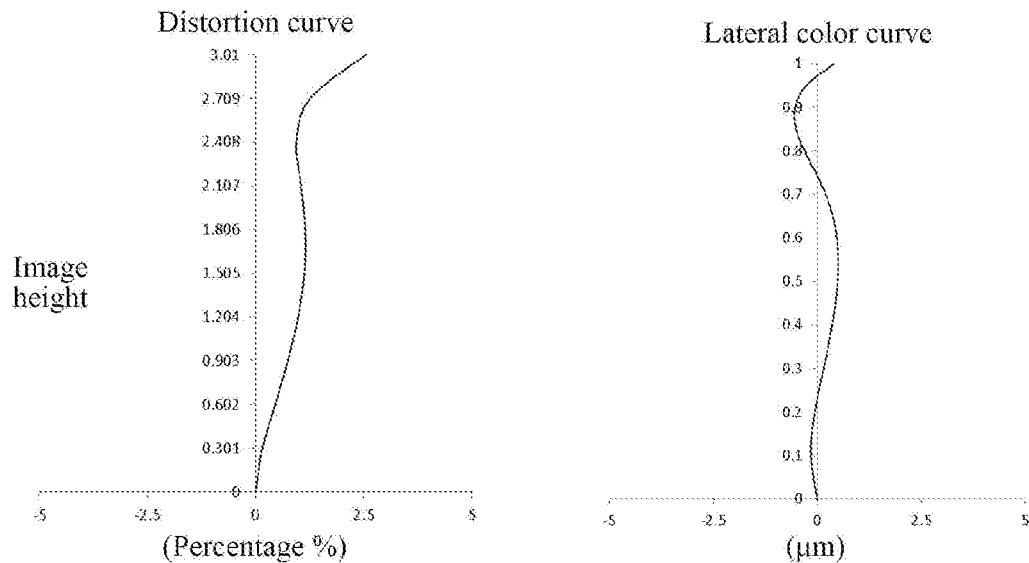
Fig. 12C
Fig. 12D
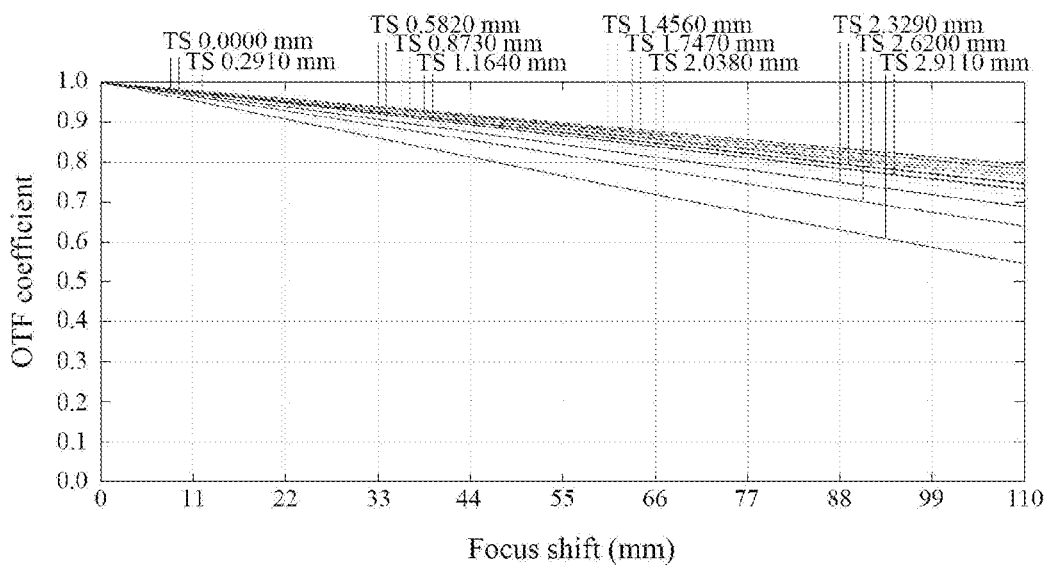
Fig. 13A

OPTICAL IMAGING LENS GROUP

CROSS-REFERENCE TO RELATED APPLICATIONS

This application claims benefit of priority to Chinese Patent Application No. 202110096278.3 filed on Jan. 25, 2021 before the China National Intellectual Property Administration, the entire disclosure of which is incorporated herein by reference in its entity.

TECHNICAL FIELD

The present disclosure relates to the field of optical elements, and in particular, to an optical imaging lens group.

BACKGROUND

With the rapid development of the lens assembly industry, the imaging quality of optical imaging lens groups applied to portable electronic products such as smart phones is getting higher and higher. At the same time, users have more and more requirements for mobile phone cameras. At present, most of the mobile phone cameras on the market (especially front cameras of mobile phones) are fixed-focus lens assembly structures. This fixed-focus lens assembly structure may seriously affect the shooting effect of the mobile phone camera in some shooting scenarios.

How to design an optical imaging lens group having the autofocus function to capture the best picture in time in different shooting scenarios is one of the problems that many lens assembly designers need to solve urgently.

SUMMARY

One aspect of the present disclosure provides an optical imaging lens group, and the optical imaging lens group along an optical axis from an object side to an image side sequentially includes: an autofocus component, a first lens, a second lens, a third lens, a fourth lens, and at least one subsequent lens, where a radius of curvature of an image-side surface of the autofocus component is variable; and there is an interval between any two adjacent lenses from the first lens to the at least one subsequent lens.

In an embodiment, there is at least one aspheric surface among the object-side surface of the first lens to the image-side surface of a lens closest to the image side.

In an embodiment, an effective focal length f1 of the first lens and an effective focal length f2 of the second lens satisfy: $-2.5<f2/f1<-1.0$.

In an embodiment, a total effective focal length f of the optical imaging lens group and an effective focal length f4 of the fourth lens satisfy: $0<f4/f<0.7$.

In an embodiment, a radius of curvature R2 of an image-side surface of the first lens and a radius of curvature R3 of an object-side surface of the second lens satisfy: $-5.5<R2/R3<-1.0$.

In an embodiment, an effective focal length f1 of the first lens and a radius of curvature R1 of an object-side surface of the first lens satisfy: $1.5<f1/R1<2.1$.

In an embodiment, a radius of curvature R7 of an object-side surface of the fourth lens and a radius of curvature R8 of an image-side surface of the fourth lens satisfy: $2.0<R7/R8<6.1$.

In an embodiment, a center thickness CT1 of the first lens on the optical axis and a spaced interval T12 between the first lens and the second lens on the optical axis satisfy: $2.0<CT1/T12<3.6$.

In an embodiment, a spaced interval T12 between the first lens and the second lens on the optical axis and a spaced interval T23 between the second lens and the third lens on the optical axis satisfy: $1.7<T23/T12<3.5$.

In an embodiment, a center thickness CT4 of the fourth lens on the optical axis and a spaced interval T34 between the third lens and the fourth lens on the optical axis satisfy: $1.0<CT4/T34<2.0$.

In an embodiment, a half of a maximum field-of-view of the optical imaging lens group Semi-FOV satisfies: Semi-FOV$>30°$.

In an embodiment, a sum of center thickness $\Sigma CT$ of the first lens to a lens closest to the image side on the optical axis and a center thickness D of the autofocus component on the optical axis satisfy: $3.5<\Sigma CT/D<4.6$.

In an embodiment, a distance TTL from the object-side surface of the first lens to an imaging plane of the optical imaging lens group on the optical axis and a sum of spaced intervals $\Sigma AT$ of each two adjacent lenses on the optical axis among the first lens to a lens closest to the image side satisfy: $3.5<TTL/\Sigma AT<4.5$.

In an embodiment, a total effective focal length f of the optical imaging lens group and a half of a diagonal length ImgH of an effective pixel area on an imaging plane of the optical imaging lens group satisfy: $1.0<f/ImgH<1.5$.

In an embodiment, the autofocus component along the optical axis from the object side sequentially includes: a light-transmitting module, a liquid material, and a flexible film. The liquid material is glued to the light-transmitting module; the flexible film is disposed on an image-side surface of the liquid material; and a radius of curvature of the image-side surface of the liquid material and a shape of the flexible film are variable.

The present disclosure provides an optical imaging lens group suitable for portable electronic products, having stable image quality, autofocus function, miniaturization, and good imaging quality through a reasonable distribution of the refractive power and optimization of optical parameters.

BRIEF DESCRIPTION OF THE DRAWINGS

By reading detailed description of non-limiting embodiments with reference to the following accompanying drawings, other features, objectives and advantages of the present disclosure will be more apparent:

FIGS. 2A-2D respectively illustrate a longitudinal aberration curve, an astigmatic curve, a distortion curve and a lateral color curve of the optical imaging lens group according to Example 1;

FIG. 3A and FIG. 3B respectively illustrate a modulation transfer function (MTF) curve diagram and a focus shift curve diagram of the optical imaging lens group in Example 1 within a waveband range of 430 nm to 650 nm when a distance from a photographed object to the optical imaging lens group is 350 mm;

FIG. 11 is a schematic structural diagram illustrating an optical imaging lens group according to Example 3 of the present disclosure;

FIGS. 12A-12D respectively illustrate a longitudinal aberration curve, an astigmatic curve, a distortion curve and a lateral color curve of the optical imaging lens group according to Example 3;

FIG. 13A and FIG. 13B respectively illustrate a modulation transfer function (MTF) curve diagram and a focus shift curve diagram of the optical imaging lens group in Example 3 within a waveband range of 430 nm to 650 nm when a distance from the photographed object to the optical imaging lens group is 350 mm;

DETAILED DESCRIPTION OF EMBODIMENTS

Figure 1:
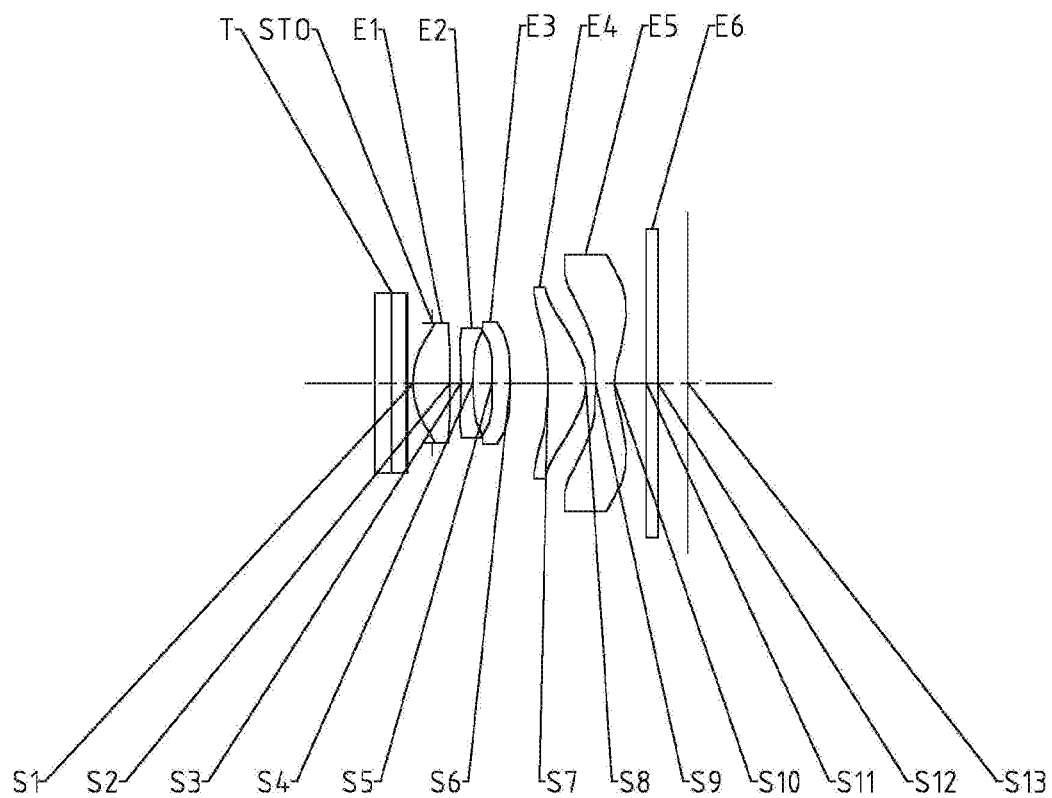
FIG. 1 is a schematic structural diagram illustrating an optical imaging lens group according to Example 1 of the present disclosure.

For a better understanding of the present disclosure, various aspects of the present disclosure will be described in more detail with reference to the accompanying drawings. It should be understood that the detailed description is merely an illustration for the exemplary implementations of the present disclosure rather than a limitation to the scope of the present disclosure in any way. Throughout the specification, the same reference numerals designate the same elements.

The expression "and/or" includes any and all combinations of one or more of the associated listed items.

It should be noted that in the specification, the expressions, such as "first," "second" and "third" are only used to distinguish one feature from another, rather than represent any limitations to the features. Thus, the first lens discussed below may also be referred to as the second lens or the third lens without departing from the teachings of the present disclosure.

In the accompanying drawings, the thicknesses, sizes and shapes of the lenses have been slightly exaggerated for the convenience of explanation. Specifically, shapes of spherical surfaces or aspheric surfaces shown in the accompanying drawings are shown by examples. That is, the shapes of the spherical surfaces or the aspheric surfaces are not limited to the shapes of the spherical surfaces or the aspheric surfaces shown in the accompanying drawings. The accompanying drawings are merely illustrative and not strictly drawn to scale.

In this text, the paraxial area refers to an area near the optical axis. If the surface of a lens is a convex surface and the position of the convex surface is not defined, it indicates that the surface of the lens is a convex surface at least in the paraxial area; and if the surface of a lens is a concave surface and the position of the concave surface is not defined, it indicates that the surface of the lens is a concave surface at least in the paraxial area. The surface closest to the object in each lens is referred to as the object-side surface, and the surface closest to the image plane in each lens is referred to as the image-side surface.

It should be further understood that the terms "comprising," "including," "having", "containing" and/or "contain," when used in the specification, specify the presence of stated features, elements and/or components, but do not exclude the presence or addition of one or more other features, elements, components and/or combinations thereof. In addition, expressions, such as "at least one of," when preceding a list of features, modify the entire list of features rather than an individual element in the list. Further, the use of "may," when describing embodiments of the present disclosure, refers to "one or more embodiments of the present disclosure." Also, the term "exemplary" is intended to refer to an example or illustration.

Unless otherwise defined, all terms (including technical and scientific terms) used herein have the same meaning as commonly understood by those of ordinary skill in the art to which the present disclosure belongs. It should be further understood that terms (i.e., those defined in commonly used dictionaries) should be interpreted as having a meaning that is consistent with their meaning in the context of the relevant art and will not be interpreted in an idealized or overly formal sense unless expressly so defined herein.

It should also be noted that the embodiments in the present disclosure and the features in the embodiments may be combined with each other on a non-conflict basis. The present disclosure will be described below in detail with reference to the accompanying drawings and in combination with the embodiments.

The features, principles, and other aspects of the present disclosure are described in detail below.

The optical imaging lens group according to exemplary implementations of the present disclosure may include an autofocus component and at least five lenses having refractive powers. The at least five lenses having refractive powers are a first lens, a second lens, a third lens, a fourth lens and at least one subsequent lens, respectively. The autofocus component and the at least five lenses having refractive powers are sequentially arranged from the object side to the image side along the optical axis. There may be a spaced interval between the autofocus component and the first lens. There may be a spaced interval between any two adjacent lenses of the first lens to a lens closest to the image side.

According to an exemplary implementation of the present disclosure, the autofocus component along the optical axis from the object side may sequentially include: a light-transmitting module and a liquid material. The light-transmitting module and the liquid material are glued together, that is, the light-transmitting module and an object-side surface of the liquid material are glued together, so that a total length of the optical imaging lens group may be effectively reduced, the space of the optical imaging lens group may be saved, and an autofocus function of the lens group may be realized. In particular, the light-transmitting module may be an optical lens.

According to an exemplary implementation of the present disclosure, the autofocus component further includes a flexible film arranged on an image-side surface of the liquid material. A radius of curvature of an image-side surface of the autofocus component is variable, that is, a radius of curvature of the image-side surface of the liquid material and a shape of the flexible film are variable. The radius of curvature of the image-side surface of the autofocus component may be changed with the change of a distance between the optical imaging lens group and the photographed object, so as to realize the autofocus function of the optical imaging lens group.

Figure 31A:
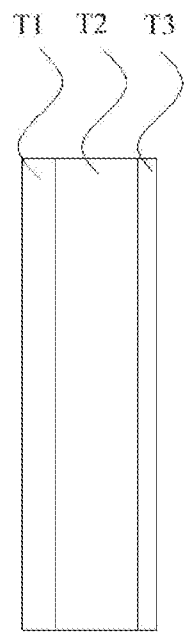
FIG. 31A and FIG. 31B respectively illustrate schematic structural diagrams of an autofocus component of the optical imaging lens group in the present disclosure when a distance from the photographed object to the optical imaging lens group is different.
Figure 31B:
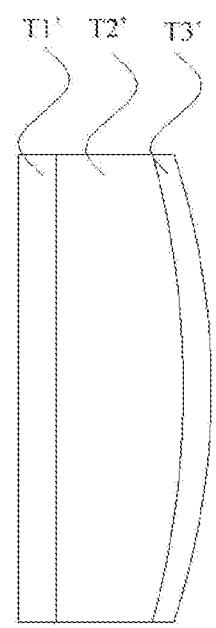

According to an exemplary implementation of the present disclosure, the autofocus component may include: the light-transmitting module, the liquid material and the flexible film. FIG. 31A shows a schematic structural diagram of a light-transmitting module T1, a liquid material T2 and a flexible film T3 in the present disclosure, where the liquid material T2 and the flexible film T3 are both plane structures. FIG. 31B shows a schematic structural diagram of a light-transmitting module T1', a liquid material T2' and a flexible film T3' in the present disclosure, where the image-side surface of the liquid material T2' and the flexible film T3' are deformed. Specifically, the liquid material T2' may be disposed between the light-transmitting module T1' and the flexible film T3', and the liquid material T2' may be connected to a conductive material (not shown). When an external voltage is applied to the conductive material, the image-side surface of the liquid material T2' may be deformed, which in turn drives the flexible film T3' to deform, and changes a focal length of the autofocus component, thereby adjusting a total effective focal length of the optical imaging lens group. It should be understood that the liquid material in the present disclosure does not only include one material. In actual production, in order to reasonably adjust the total effective focal length of the optical imaging lens group, multiple kinds of liquid materials, such as a first liquid material, or a second liquid material, may be disposed between the light-transmitting module and the flexible film according to specific needs. In addition, the first liquid material, the second liquid material, and the like are not immiscible with each other. When a voltage is applied to the conductive material, the liquid material may be deformed, which in turn drives shapes of contact surfaces of the flexible film, the first liquid material and the second liquid material to change, so that the focal length of the autofocus component is changed, thereby adjusting the total effective focal length of the optical imaging lens group.

According to an exemplary implementation of the present disclosure, drive systems such as voice coil motors, microelectromechanical systems, piezoelectric systems, and memory metals may be used to apply voltage to the conductive material. The drive system may adjust the focal length of the optical imaging lens group to make the optical imaging lens group have a good imaging position, so that the optical imaging lens group can clearly image at different distances to the photographed object.

According to an exemplary implementation of the present disclosure, the optical imaging lens group according to the present disclosure may satisfy: $-2.5 < f2/f1 < -1.0$, where f1 is an effective focal length of the first lens, and f2 is an effective focal length of the second lens. More specifically, f2 and f1 may further satisfy: $-2.4 < f2/f1 < -1.4$. Satisfying $-2.5 < f2/f1 < -1.0$ may effectively reduce an optical sensitivity of the first lens and the second lens, which is beneficial to the mass production of the first lens and the second lens.

According to an exemplary implementation of the present disclosure, the optical imaging lens group according to the present disclosure may satisfy: $0 < f4/f < 0.7$, where f is a total effective focal length of the optical imaging lens group, and f4 is an effective focal length of the fourth lens. More specifically, f4 and f may further satisfy: $0.4 < f4/f < 0.7$. Satisfying $0 < f4/f < 0.7$ may reduce a deflection angle of light passing through the fourth lens, thereby helping reduce sensitivity of the optical imaging lens group.

According to an exemplary implementation of the present disclosure, the optical imaging lens group according to the present disclosure may satisfy: $-5.5 < R2/R3 < -1.0$, where R2 is a radius of curvature of an image-side surface of the first lens, and R3 is a radius of curvature of an object-side surface of the second lens. More specifically, R2 and R3 may further satisfy: $-5.4 < R2/R3 < -1.4$. Satisfying $-5.5 < R2/R3 < -1.0$ may make light have good optical path deflection in the optical imaging lens group.

According to an exemplary implementation of the present disclosure, the optical imaging lens group according to the present disclosure may satisfy: $1.5 < f1/R1 < 2.1$, where f1 is an effective focal length of the first lens, and R1 is a radius of curvature of an object-side surface of the first lens. More specifically, f1 and R1 may further satisfy: $1.8 < f1/R1 < 2.1$. Satisfying $1.5 < f1/R1 < 2.1$ may control a deflection angle of light in an edge field-of-view at the first lens, which may further effectively reduce the sensitivity of the optical imaging lens group.

According to an exemplary implementation of the present disclosure, the optical imaging lens group according to the present disclosure may satisfy: $2.0 < R7/R8 < 6.1$, where R7 is a radius of curvature of an object-side surface of the fourth lens, and R8 is a radius of curvature of an image-side surface of the fourth lens. More specifically, R7 and R8 may further satisfy: $2.4 < R7/R8 < 6.1$. Satisfying $2.0 < R7/R8 < 6.1$ may control a deflection angle of light in an edge field-of-view at the fourth lens, which may further effectively reduce the sensitivity of the optical imaging lens group.

According to an exemplary implementation of the present disclosure, the optical imaging lens group according to the present disclosure may satisfy: $2.0 < CT1/T12 < 3.6$, where CT1 is a center thickness of the first lens on the optical axis, and T12 is a spaced interval between the first lens and the second lens on the optical axis. More specifically, CT1 and T12 may further satisfy: $2.4 < CT1/T12 < 3.6$. Satisfying $2.0 < CT1/T12 < 3.6$ may effectively avoid ghost images between the first lens and the second lens, and may make the optical imaging lens group have a better function of correcting spherical aberrations and distortion.

According to an exemplary implementation of the present disclosure, the optical imaging lens group according to the present disclosure may satisfy: $1.7 < T23/T12 < 3.5$, where T12 is a spaced interval between the first lens and the second lens on the optical axis, and T23 is a spaced interval between the second lens and the third lens on the optical axis. More specifically, T23 and T12 may further satisfy: $1.7 < T23/T12 < 3.2$. Satisfying $1.7 < T23/T12 < 3.5$ may control the contribution of field curvature of each field-of-view of the optical imaging lens group within a reasonable range.

According to an exemplary implementation of the present disclosure, the optical imaging lens group according to the present disclosure may satisfy: $1.0 < CT4/T34 < 2.0$, where CT4 is a center thickness of the fourth lens on the optical axis, and T34 is a spaced interval between the third lens and the fourth lens on the optical axis. More specifically, CT4 and T34 may further satisfy: $1.0 < CT4/T34 < 1.9$. Satisfying $1.0 < CT4/T34 < 2.0$ may help the uniform distribution of sizes of lenses, ensure the assembly stability of the lens group, and help reduce an overall aberration of the optical imaging lens group.

According to an exemplary implementation of the present disclosure, the optical imaging lens group according to the present disclosure may satisfy: Semi-FOV>30°, where Semi-FOV is a half of a maximum field-of-view of the optical imaging lens group. More specifically, Semi-FOV may further satisfy: Semi-FOV>33°. Satisfying Semi-FOV>30° may effectively control a field-of-view range of the optical imaging lens group, which is beneficial to improve image quality.

According to an exemplary implementation of the present disclosure, the optical imaging lens group according to the present disclosure may satisfy: $3.5 < \Sigma CT/D < 4.6$, where $\Sigma CT$ is a sum of center thickness of the first lens to a lens closest to the image side on the optical axis, and D is a center thickness of the autofocus component on the optical axis. More specifically, $\Sigma CT$ and D may further satisfy: $3.7 < \Sigma CT/D < 4.6$. Satisfying $3.5 < \Sigma CT/D < 4.6$ may help the uniform distribution of sizes of lenses, ensure the assembly stability of the lens group, and to shorten the total length of the optical imaging lens group.

According to an exemplary implementation of the present disclosure, the optical imaging lens group according to the present disclosure may satisfy: $3.5 < TTL/\Sigma AT < 4.5$, where TTL is a distance from the object-side surface of the first lens to an imaging plane of the optical imaging lens group on the optical axis, and $\Sigma AT$ is a sum of spaced intervals of each two adjacent lenses on the optical axis from the first lens to a lens closest to the image side. Satisfying $3.5 < TTL/\Sigma AT < 4.5$ may reasonably control the distortion of the lens group, so that the lens group has a good distortion effect.

According to an exemplary implementation of the present disclosure, the optical imaging lens group according to the present disclosure may satisfy: $1.0 < f/ImgH < 1.5$, where f is a total effective focal length of the optical imaging lens group, and ImgH is a half of a diagonal length of an effective pixel area on an imaging plane of the optical imaging lens group. More specifically, f and ImgH may further satisfy: $1.2 < f/ImgH < 1.5$. Satisfying $1.0 < f/ImgH < 1.5$ is beneficial to make light have good optical path deflection in the lens group.

In an exemplary implementation, the optical imaging lens group according to the present disclosure further includes a stop arranged between the autofocus component and the first lens. Alternatively, the optical imaging lens group may further include an optical filter for correcting color deviation and/or a protective glass for protecting a photosensitive element on the imaging plane. The present disclosure proposes an optical imaging lens group having characteristics such as miniaturization, autofocus, stable image quality, and high imaging quality. The optical imaging lens group according to the above implementations of the present disclosure may employ a plurality of lenses, such as five lenses as described above. By reasonably distributing the refractive power of each lens, the surface shape, the center thickness of each lens and the spaced intervals along the optical axis between the lenses, it may effectively converge incident light, reduce a total track length of the imaging lens assembly and improve the processability of the imaging system, making the optical imaging lens group more conducive to production and processing.

In the implementations of the present disclosure, at least one of the surfaces of the lenses is an aspheric surface, that is, at least one of the surfaces from the object-side surface of the first lens to the image-side surface of the lens closest to the image side is an aspheric surface. The characteristic of the aspheric lens is: the curvature is continuously changing from the center of the lens to the periphery of the lens. Unlike the spherical lens with a constant curvature from the center of the lens to the periphery, the aspheric lens has a better radius of curvature characteristic, having advantages of improving the distortion aberration and improving the astigmatic aberration. The use of the aspheric lens can eliminate as much as possible the aberrations that occur during the imaging, thereby improving the imaging quality. Alternatively, at least one of the object-side surface and the image-side surface of each of the first lens, the second lens, the third lens, the fourth lens and the at least one subsequent lens is an aspheric surface. Alternatively, the object-side surface and the image-side surface of each of the first lens, the second lens, the third lens, the fourth lens and the at least one subsequent lens are aspheric surfaces.

However, it should be understood by those skilled in the art that the various results and advantages described in the present specification may be obtained by changing the number of the lenses constituting the optical imaging lens group without departing from the technical solution claimed by the present disclosure. For example, although the optical imaging lens group having five lenses or six lenses is described as an example in the implementations, the optical imaging lens group is not limited to include five lenses or six lenses. If desired, the optical imaging lens group may also include other numbers of lenses.

Specific examples of the optical imaging lens group that may be applied to the above implementations are further described below with reference to the accompanying drawings.

Example 1

An optical imaging lens group according to Example 1 of the present disclosure is described below with reference to FIGS. 1-5B. FIG. 1 is a schematic structural diagram illustrating the optical imaging lens group according to Example 1 of the present disclosure.

As shown in FIG. 1, the optical imaging lens group from an object side to an image side sequentially includes: an autofocus component T (including a light-transmitting module, a liquid material and a flexible film), a stop STO, a first lens E1, a second lens E2, a third lens E3, a fourth lens E4, a fifth lens E5, an optical filter E6 and an imaging plane S13.

The first lens E1 has a positive refractive power, an object-side surface S1 of the first lens is a convex surface, and an image-side surface S2 of the first lens is a concave surface. The second lens E2 has a negative refractive power, an object-side surface S3 of the second lens is a concave surface, and an image-side surface S4 of the second lens is a concave surface. The third lens E3 has a positive refractive power, an object-side surface S5 of the third lens is a convex surface, and an image-side surface S6 of the third lens is a convex surface. The fourth lens E4 has a positive refractive power, an object-side surface S7 of the fourth lens is a concave surface, and an image-side surface S8 of the fourth lens is a convex surface. The fifth lens E5 has a negative refractive power, an object-side surface S9 of the fifth lens is a concave surface, and an image-side surface S10 of the fifth lens is a concave surface. The optical filter E6 has an object-side surface S11 and an image-side surface S12. Light from an object sequentially passes through the light-transmitting module to the image-side surface S12 of the optical filter E6 and is finally imaged on the imaging plane S13.

Table 1 is a table illustrating basic parameters of the optical imaging lens group of Example 1, where the units for the radius of curvature, the thickness/distance and the focal length are millimeter (mm).

TABLE 1

| Surface number | Surface type | Radius of curvature | Thickness/ Distance | Material Refractive index | Abbe number | Focal length | Conic coefficient |
|---|---|---|---|---|---|---|---|
| OBJ | Spherical | infinite | D1 | | | | |
| | Spherical | infinite | 0.3000 | 1.52 | 64.2 | | |
| | Spherical | infinite | 0.2650 | 1.55 | 29.9 | | |
| | Spherical | RT | 0.0200 | 1.53 | 65.4 | | |
| | Spherical | | 0.4500 | | | | |
| STO | Spherical | infinite | −0.3500 | | | | |
| S1 | Aspheric | 1.5494 | 0.6566 | 1.55 | 56.1 | 2.96 | −0.0503 |
| S2 | Aspheric | 32.2278 | 0.2015 | | | | −90.0000 |
| S3 | Aspheric | −8.1223 | 0.2100 | 1.67 | 20.4 | −4.31 | 29.5889 |
| S4 | Aspheric | 4.4932 | 0.3436 | | | | −50.5475 |
| S5 | Aspheric | 20.0000 | 0.3291 | 1.64 | 23.5 | 14.80 | 68.5880 |
| S6 | Aspheric | −18.1138 | 0.6763 | | | | −90.0000 |
| S7 | Aspheric | −5.8413 | 0.6768 | 1.55 | 56.1 | 2.02 | −44.8266 |
| S8 | Aspheric | −0.9666 | 0.1730 | | | | −1.0119 |
| S9 | Aspheric | −14.1818 | 0.3300 | 1.54 | 55.8 | −1.73 | 23.7569 |
| S10 | Aspheric | 1.0037 | 0.5741 | | | | −0.9927 |
| S11 | Spherical | infinite | 0.2100 | 1.52 | 64.2 | | |

TABLE 1-continued

| Surface number | Surface type | Radius of curvature | Thickness/ Distance | Material Refractive index | Abbe number | Focal length | Conic coefficient |
|---|---|---|---|---|---|---|---|
| S12 | Spherical | infinite | 0.5339 | | | | |
| S13 | Spherical | infinite | | | | | |

In this example, the light-transmitting module and the liquid material may be glued together. By changing the radius of curvature of a flexible film surface of the autofocus component T and the radius of curvature of an image-side surface of the liquid material, the total effective focal length of the optical imaging lens group may be changed with the change of a distance from the photographed object to the optical imaging lens group, thereby realizing the autofocus function of the optical imaging lens group. Specifically, when the distance D1 between the optical imaging lens group and the photographed object is 350 mm, the image-side surface of the autofocus component T (i.e., the image-side surface of the liquid material and the flexible film surface) is a plane, and the radius of curvature RT is infinite. When the distance D1 between the optical imaging lens group and the photographed object is 150 mm, the image-side surface of the autofocus component T is a concave surface, and the radius of curvature RT is 3.5300. When the distance D1 between the optical imaging lens group and the photographed object is infinite, the image-side surface of the autofocus component T is a convex surface, and the radius of curvature RT is −4.7400.

In this example, a total effective focal length f of the optical imaging lens group is 4.11 mm, a total track length TTL of the optical imaging lens group (that is, a distance from the object-side surface of the first lens to the imaging plane S13 of the optical imaging lens group on the optical axis) is 4.91 mm, a half of a diagonal length ImgH of an effective pixel area on the imaging plane S13 of the optical imaging lens group is 3.01 mm, a half of a maximum field-of-view Semi-FOV of the optical imaging lens group is 35.0°, and an F number Fno of the optical imaging lens group is 2.00.

In Example 1, the object-side surface and the image-side surface of each of the first lens E1 to the fifth lens E5 are aspheric. The surface shape x of each aspheric lens may be defined by using, but not limited to, the following aspheric formula:

$$x = \frac{ch^2}{1+\sqrt{1-(k+1)c^2h^2}} + \sum A_i h^i \qquad (1)$$

Where, x is the sag—the axis-component of the displacement of the surface from the aspheric vertex, when the surface is at height h from the optical axis; c is a paraxial curvature of the aspheric surface, c=1/R (that is, the paraxial curvature c is reciprocal of the radius of curvature R in the above Table 1); k is a conic coefficient; Ai is a correction coefficient for the i-th order of the aspheric surface. Table 2 below shows high-order coefficients $A_4$, $A_6$, $A_8$, $A_{10}$, $A_{12}$, $A_{14}$, $A_{16}$, $A_{18}$ and $A_{20}$ applicable to each aspheric surface S1 to S10 in Example 1.

TABLE 2

| Surface number | A4 | A6 | A8 | A10 | A12 |
|---|---|---|---|---|---|
| S1 | −6.2010E−03 | −1.9154E−03 | −5.1595E−04 | −9.5721E−05 | −2.4498E−05 |
| S2 | −1.8046E−02 | −5.1023E−04 | −5.2167E−04 | 4.8537E−06 | 2.6816E−07 |
| S3 | 2.8969E−02 | 4.5521E−03 | −5.7808E−04 | 2.4389E−04 | −1.7807E−05 |
| S4 | 4.3626E−02 | 3.0780E−03 | −2.4469E−04 | 1.5417E−04 | 1.6876E−05 |
| S5 | −1.0360E−01 | −3.6572E−03 | −7.4873E−04 | 1.8454E−05 | −4.6300E−06 |
| S6 | −1.5442E−01 | −1.7126E−03 | 7.7290E−04 | 4.6650E−04 | 1.8538E−04 |
| S7 | −1.3624E−01 | 2.4350E−02 | 3.0234E−03 | −2.1506E−03 | 3.4271E−04 |
| S8 | 6.8822E−01 | −6.6426E−02 | 2.9580E−02 | −1.7076E−02 | 7.8311E−03 |
| S9 | −5.6261E−01 | 1.8150E−01 | −2.5807E−02 | 1.0728E−02 | 1.2525E−03 |
| S10 | −2.8945E+00 | 5.1358E−01 | −1.6166E−01 | 6.5327E−02 | −2.3554E−02 |

| Surface number | A14 | A16 | A18 | A20 |
|---|---|---|---|---|
| S1 | −2.2903E−07 | −2.0715E−06 | 2.2529E−06 | −1.1343E−06 |
| S2 | −2.5685E−06 | 6.8244E−07 | −3.8136E−07 | 1.6649E−06 |
| S3 | 4.6713E−06 | −1.1095E−06 | −5.5562E−07 | 2.6345E−07 |
| S4 | 1.7781E−06 | 5.3884E−06 | −2.4551E−06 | 2.0884E−06 |
| S5 | 2.1675E−05 | −6.0453E−06 | 6.5881E−06 | −4.2497E−06 |
| S6 | 4.9217E−05 | 1.6191E−05 | 2.1849E−06 | 1.4446E−06 |
| S7 | 1.5213E−04 | 1.4821E−05 | −2.3473E−05 | 4.2882E−07 |
| S8 | −1.4574E−03 | 8.1252E−04 | −7.9964E−04 | 2.2021E−04 |
| S9 | −4.2088E−03 | 9.8721E−04 | −1.1090E−03 | 8.2573E−04 |
| S10 | 1.1218E−02 | A.7130E−03 | 2.2677E−03 | −1.0369E−03 |

Figures 2A, 2B:
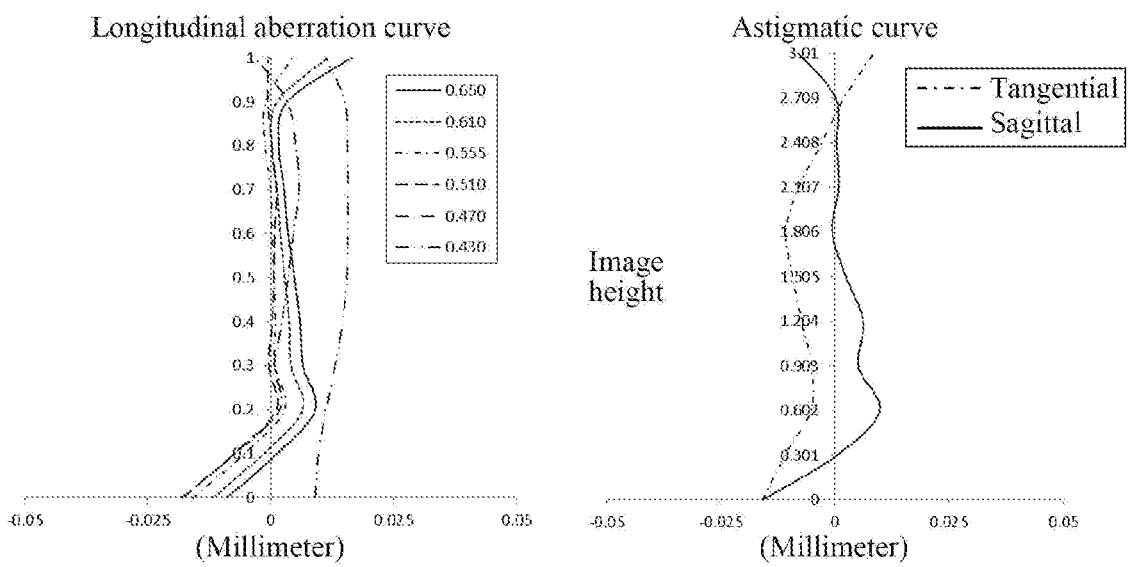
Figure 3B:
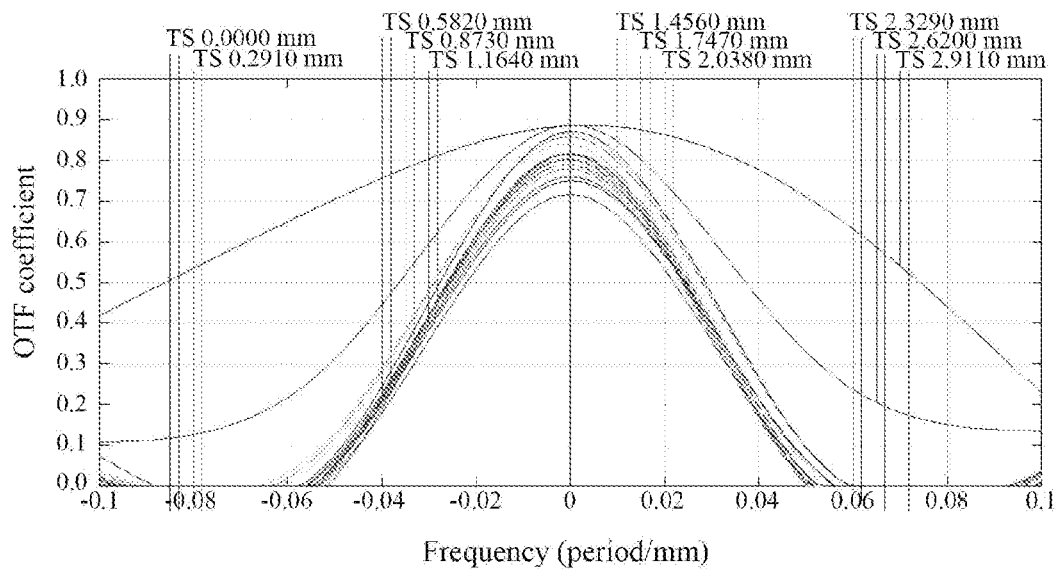
Figure 4A:
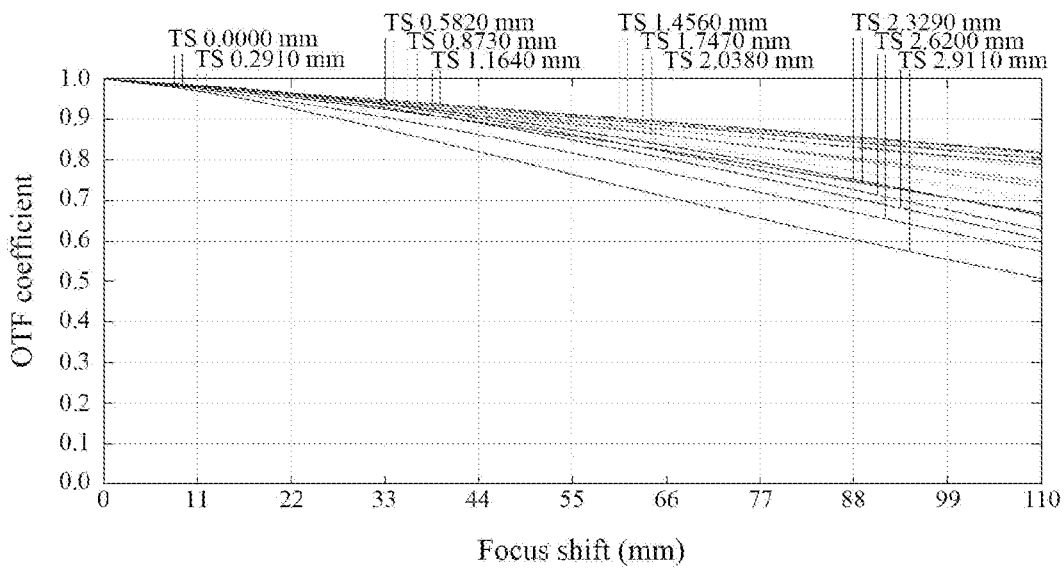
FIG. 4A and FIG. 4B respectively illustrate an MTF curve diagram and a focus shift curve diagram of the optical imaging lens group in Example 1 within a waveband range of 430 nm to 650 nm when a distance from the photographed object to the optical imaging lens group is 150 mm.
Figure 4B:
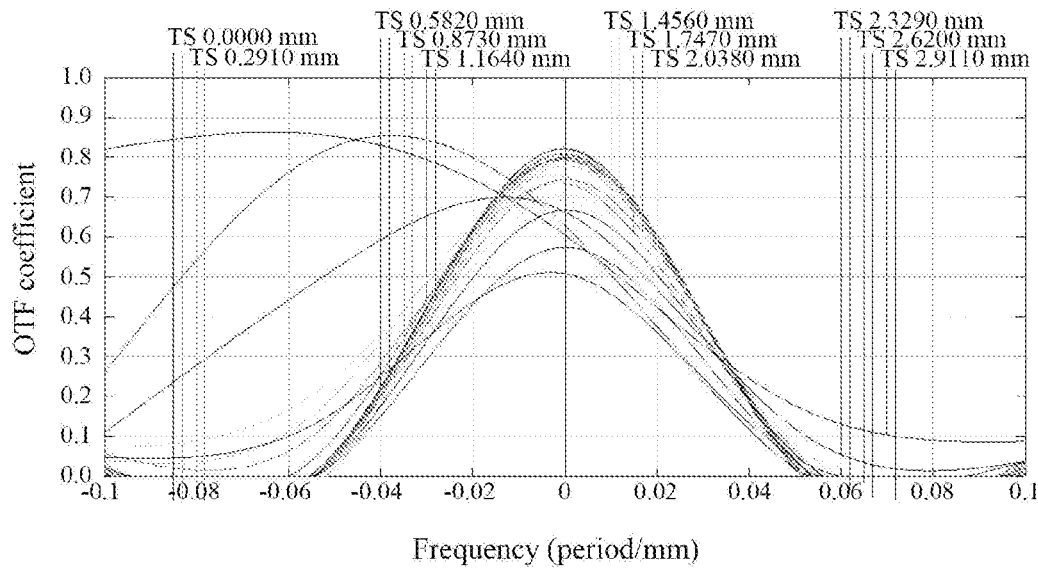
Figure 5A:
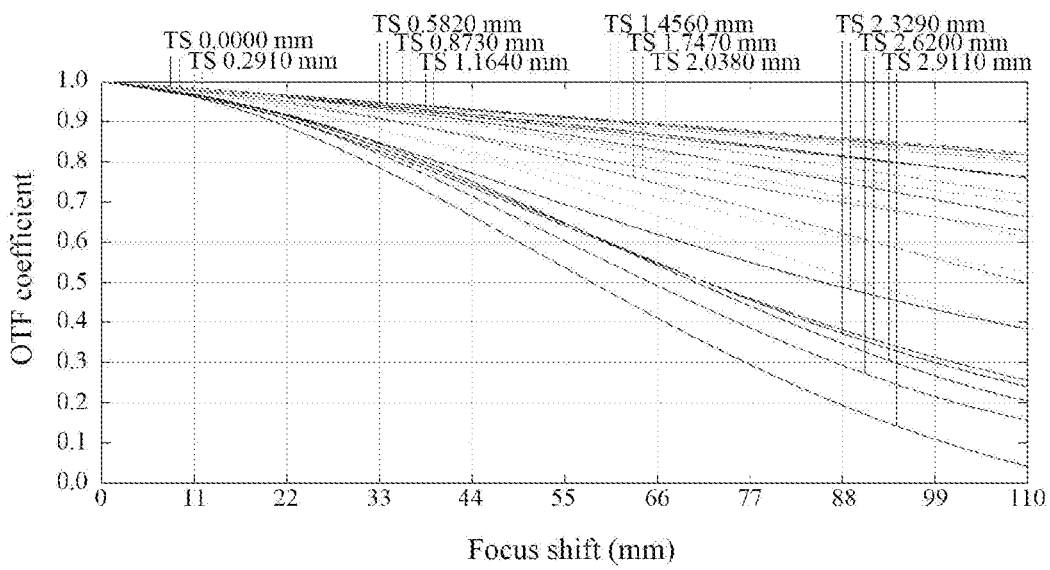
FIG. 5A and FIG. 5B respectively illustrate an MTF curve diagram and a focus shift curve diagram of the optical imaging lens group in Example 1 within a waveband range of 430 nm to 650 nm when a distance from the photographed object to the optical imaging lens group is infinite.
Figure 5B:
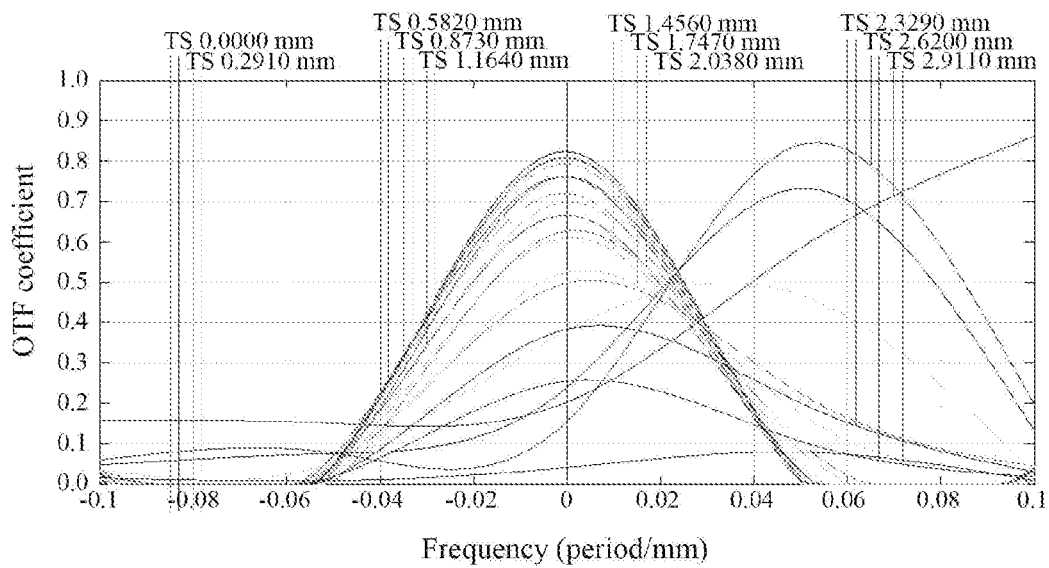

FIG. 2A illustrates the longitudinal aberration curve of the optical imaging lens group according to Example 1, representing deviations of focal points converged by light of different wavelengths after passing through the lens assembly. FIG. 2B illustrates the astigmatic curve of the optical imaging lens group according to Example 1, representing a curvature of a tangential plane and a curvature of a sagittal plane. FIG. 2C illustrates the distortion curve of the optical imaging lens group according to Example 1, representing the amounts of distortion corresponding to different image heights. FIG. 2D illustrates the lateral color curve of the optical imaging lens group according to Example 1, representing deviations of different heights of images on an imaging plane formed by light passing through the lens assembly. FIG. 3A, FIG. 4A and FIG. 5A respectively illustrate MTF curve diagrams of the optical imaging lens group in Example 1 within a waveband range of 430 nm to 650 nm, when the distance from the photographed object to the optical imaging lens group is 350 mm, 150 mm and infinite, representing pixel sizes of a tangential field-of-view and a sagittal field-of-view at different frequencies. FIG. 3B, FIG. 4B and FIG. 5B respectively illustrate focus shift curve diagrams of the optical imaging lens group in Example 1 within a waveband range of 430 nm to 650 nm, when the distance from the photographed object to the optical imaging lens group is 350 mm, 150 mm and infinite, representing pixel sizes of a tangential field-of-view and a sagittal field-of-view under different focal shifts (that is, a difference between the actual focal length and a theoretical focal length). It can be seen from FIG. 2A to FIG. 5B that the optical imaging lens group provided in Example 1 can achieve good imaging quality.

Example 2

Figure 6:
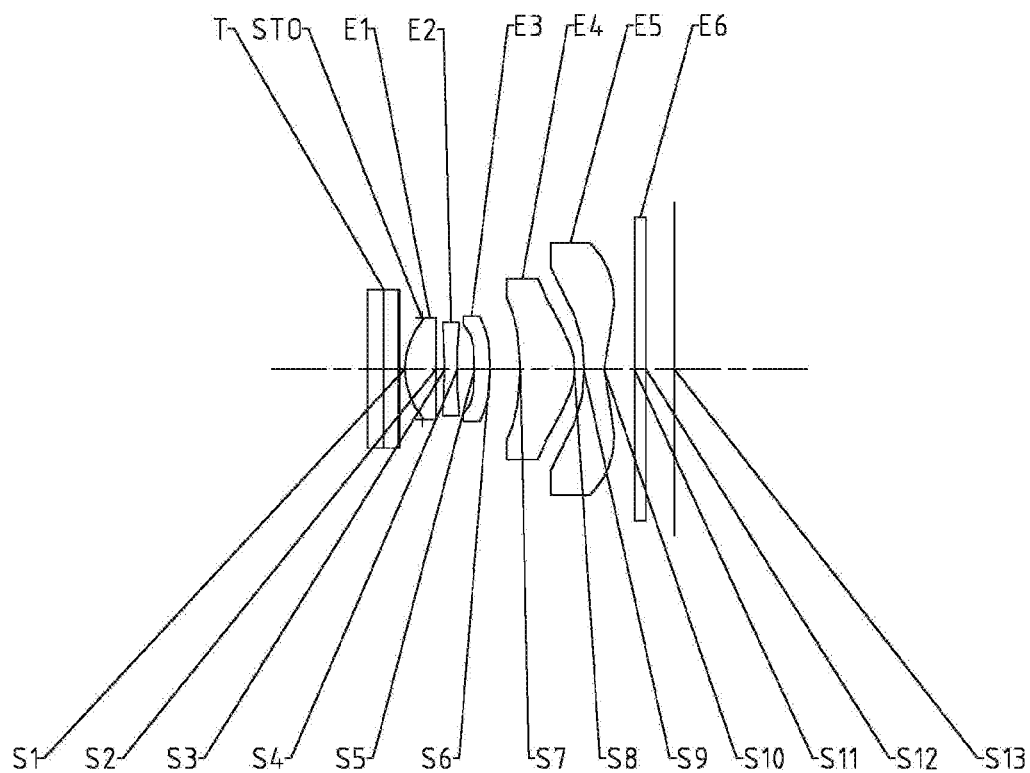
FIG. 6 is a schematic structural diagram illustrating an optical imaging lens group according to Example 2 of the present disclosure.

An optical imaging lens group according to Example 2 of the present disclosure is described below with reference to FIG. 6 to FIG. 10B. In this example and the following examples, for the purpose of brevity, the description of parts similar to those in Example 1 will be omitted. FIG. 6 illustrates a schematic structural diagram of the optical imaging lens group according to Example 2 of the present disclosure.

As shown in FIG. 6, the optical imaging lens group from an object side to an image side sequentially includes: an autofocus component T (including a light-transmitting module, a liquid material and a flexible film), a stop STO, a first lens E1, a second lens E2, a third lens E3, a fourth lens E4, a fifth lens E5, an optical filter E6 and an imaging plane S13.

The first lens E1 has a positive refractive power, an object-side surface S1 of the first lens is a convex surface, and an image-side surface S2 of the first lens is a concave surface. The second lens E2 has a negative refractive power, an object-side surface S3 of the second lens is a concave surface, and an image-side surface S4 of the second lens is a convex surface. The third lens E3 has a negative refractive power, an object-side surface S5 of the third lens is a concave surface, and an image-side surface S6 of the third lens is a convex surface. The fourth lens E4 has a positive refractive power, an object-side surface S7 of the fourth lens is a concave surface, and an image-side surface S8 of the fourth lens is a convex surface. The fifth lens E5 has a negative refractive power, an object-side surface S9 of the fifth lens is a concave surface, and an image-side surface S10 of the fifth lens is a concave surface. The optical filter E6 has an object-side surface S11 and an image-side surface S12. Light from an object sequentially passes through the light-transmitting module to the image-side surface S12 of the optical filter E6 and is finally imaged on the imaging plane S13.

In this example, a total effective focal length f of the optical imaging lens group is 4.19 mm, a total track length TTL of the optical imaging lens group is 4.91 mm, a half of a diagonal length ImgH of an effective pixel area on the imaging plane S13 of the optical imaging lens group is 3.01 mm, a half of a maximum field-of-view Semi-FOV of the optical imaging lens group is 34.5°, and an F number Fno of the optical imaging lens group is 2.38.

Table 3 is a table illustrating basic parameters of the optical imaging lens group of Example 2, where the units for the radius of curvature, the thickness/distance and the focal length are millimeter (mm). Table 4 shows high-order coefficients applicable to each aspheric surface in Example 2, where the surface shape of each aspheric surface may be defined by the formula (1) given in the above Example 1.

TABLE 3

| Surface number | Surface type | Radius of curvature | Thickness/ Distance | Material Refractive index | Abbe number | Focal length | Conic coefficient |
|---|---|---|---|---|---|---|---|
| OBJ | Spherical | infinite | D1 | | | | |
| | Spherical | infinite | 0.3000 | 1.52 | 64.2 | | |
| | Spherical | infinite | 0.2650 | 1.55 | 29.9 | | |
| | Spherical | RT | 0.0200 | 1.53 | 65.4 | | |
| | Spherical | | 0.4196 | | | | |
| STO | Spherical | infinite | −0.3196 | | | | |
| S1 | Aspheric | 1.3818 | 0.5675 | 1.55 | 56.1 | 2.71 | 0.0071 |
| S2 | Aspheric | 17.6605 | 0.1627 | | | | 87.5775 |
| S3 | Aspheric | −3.3062 | 0.2300 | 1.67 | 20.4 | −5.98 | −5.7689 |
| S4 | Aspheric | −20.0000 | 0.3081 | | | | 90.0000 |
| S5 | Aspheric | −8.5680 | 0.2843 | 1.64 | 23.5 | −440.01 | 89.8783 |
| S6 | Aspheric | −8.9498 | 0.5501 | | | | −20.2442 |
| S7 | Aspheric | −5.2063 | 0.9924 | 1.55 | 56.1 | 2.18 | −8.1001 |
| S8 | Aspheric | −1.0354 | 0.1679 | | | | −1.0172 |
| S9 | Aspheric | −6.3923 | 0.3700 | 1.54 | 55.8 | −1.75 | 0.8265 |
| S10 | Aspheric | 1.1262 | 0.5560 | | | | −1.0075 |
| S11 | Spherical | infinite | 0.2100 | 1.52 | 64.2 | | |
| S12 | Spherical | infinite | 0.5157 | | | | |
| S13 | Spherical | infinite | | | | | |

In this example, the light-transmitting module and the liquid material may be glued together. By changing the radius of curvature of a flexible film surface of the autofocus component T and the radius of curvature of an image-side surface of the liquid material, the total effective focal length of the optical imaging lens group may be changed with the change of a distance from the photographed object to the optical imaging lens group, thereby realizing the autofocus function of the optical imaging lens group. When the distance D1 between the optical imaging lens group and the photographed object is 350 mm, the image-side surface of the autofocus component T is a plane, and the radius of curvature RT is infinite. When the distance D1 between the optical imaging lens group and the photographed object is 150 mm, the image-side surface of the autofocus component T is a concave surface, and the radius of curvature RT is 3.5350. When the distance D1 between the optical imaging lens group and the object is infinite, the image-side surface of the autofocus component T is a convex surface, and the radius of curvature RT is −4.7200.

TABLE 4

| Surface number | A4 | A6 | A8 | A10 | A12 |
|---|---|---|---|---|---|
| S1 | −1.9695E−03 | −2.1322E−03 | −7.8107E−04 | −1.8826E−04 | −4.7061E−05 |
| S2 | −1.7293E−02 | −1.6539E−03 | −2.6433E−04 | 7.8808E−05 | 4.3765E−05 |
| S3 | 4.6350E−02 | 2.6364E−03 | 3.6651E−04 | 2.6820E−04 | 1.8461E−05 |
| S4 | 4.6823E−02 | 1.0217E−03 | −5.4302E−04 | −1.2287E−04 | −9.4437E−05 |
| S5 | −1.1785E−01 | −3.5552E−03 | −1.3297E−03 | −2.3701E−04 | −1.1754E−04 |
| S6 | −1.5492E−01 | 1.1359E−02 | 2.7969E−03 | 1.1157E−03 | 3.3955E−04 |
| S7 | −1.1639E−01 | 7.8287E−03 | −1.4928E−03 | 1.8829E−04 | 8.8498E−04 |
| S8 | 6.9300E−01 | −6.3287E−02 | 1.6492E−02 | −9.7839E−03 | 4.8976E−03 |
| S9 | −4.6926E−01 | 1.7644E−01 | −3.5267E−02 | 1.3352E−02 | −2.9441E−03 |
| S10 | −2.8861E+00 | 5.0888E−01 | −1.6990E−01 | 6.7970E−02 | −2.7483E−02 |

| Surface number | A14 | A16 | A18 | A20 |
|---|---|---|---|---|
| S1 | −3.0011E−06 | −2.5314E−06 | 2.2183E−06 | −7.2876E−07 |
| S2 | 6.9161E−06 | 3.2479E−06 | −3.6560E−06 | −1.9899E−06 |
| S3 | 1.6729E−05 | −2.0979E−06 | 3.3808E−06 | −2.6822E−06 |
| S4 | −6.7583E−05 | −3.4433E−05 | −3.2905E−05 | −1.9189E−05 |
| S5 | −3.5720E−05 | −2.6903E−05 | −2.5611E−06 | −5.7732E−06 |
| S6 | 9.0085E−05 | 4.7260E−05 | 2.4832E−05 | 2.0400E−05 |
| S7 | 1.0374E−04 | 4.8453E−05 | −1.5671E−05 | −4.1763E−05 |
| S8 | −1.6446E−03 | 8.0237E−04 | −8.3694E−05 | 4.1197E−04 |
| S9 | 5.4310E−04 | 5.5316E−04 | −4.5687E−04 | −4.2621E−04 |
| S10 | 1.2609E−02 | −6.0371E−03 | 2.8122E−03 | −1.4067E−03 |

Figure 7A:
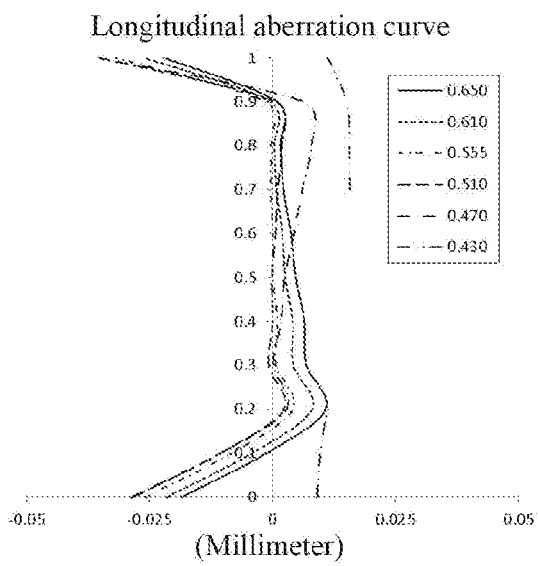
FIGS. 7A-7D respectively illustrate a longitudinal aberration curve, an astigmatic curve, a distortion curve and a lateral color curve of the optical imaging lens group according to Example 2.
Figure 7B:
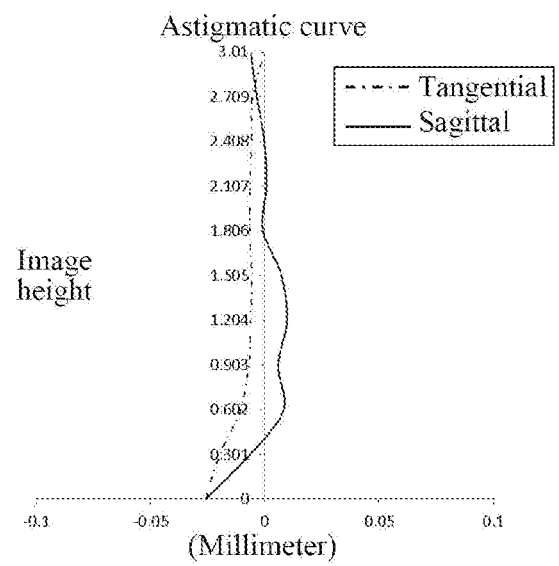
Figure 7C:
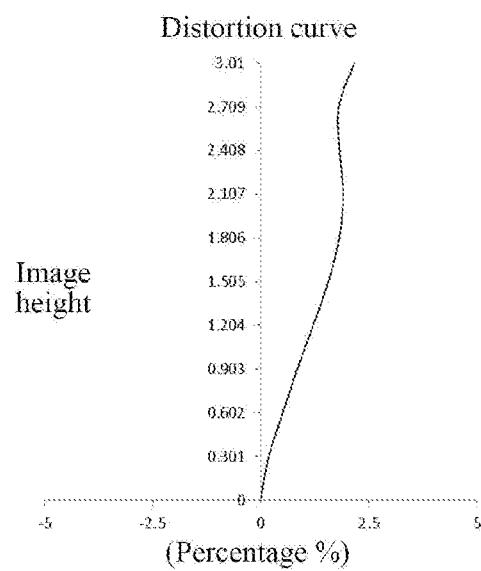
Figure 7D:
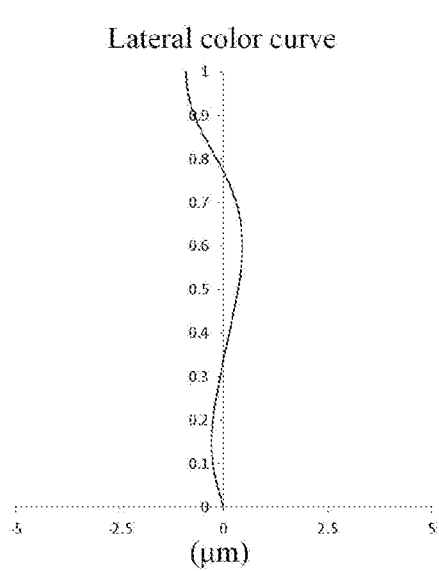
Figure 8A:
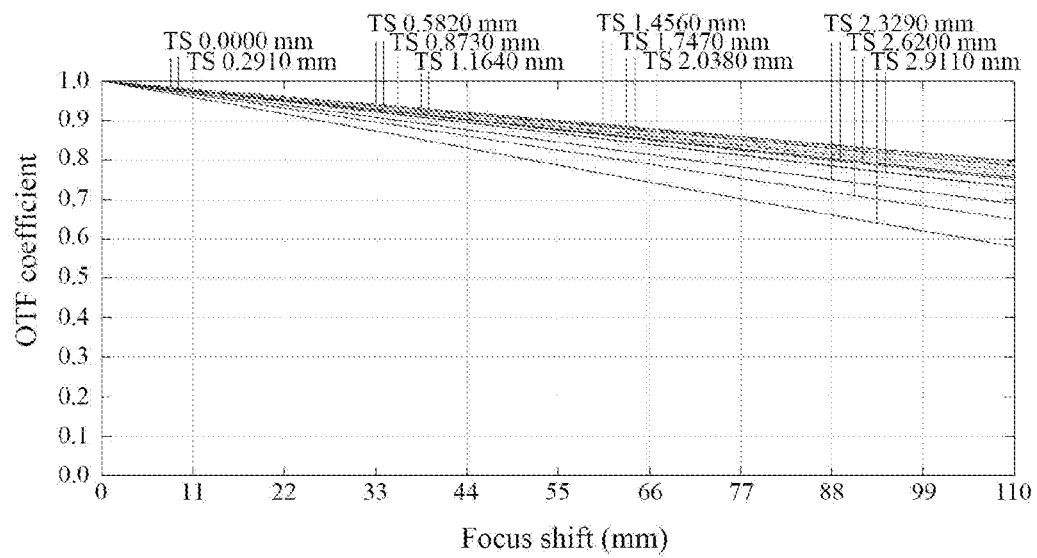
FIG. 8A and FIG. 8B respectively illustrate a modulation transfer function (MTF) curve diagram and a focus shift curve diagram of the optical imaging lens group in Example 2 when a distance from the photographed object to the optical imaging lens group is 350 mm, within a waveband range of 430 nm to 650 nm.
Figure 8B:
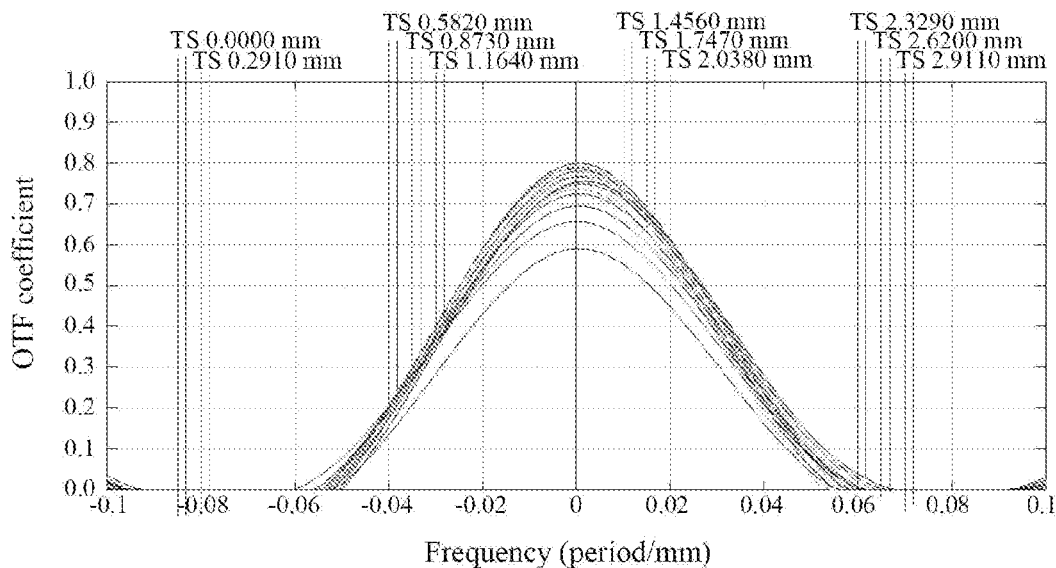
Figure 9A:
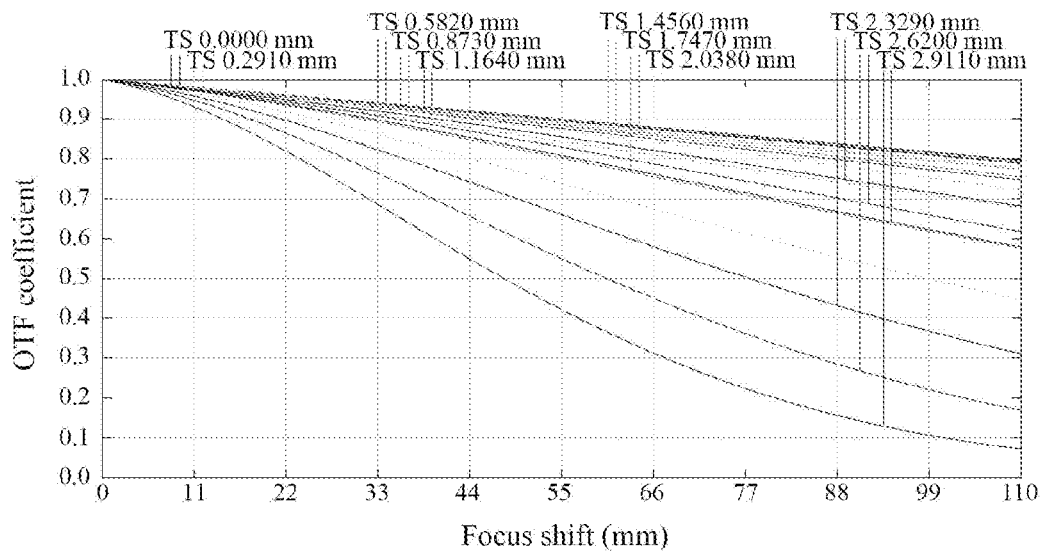
FIG. 9A and FIG. 9B respectively illustrate an MTF curve diagram and a focus shift curve diagram of the optical imaging lens group in Example 2 within a waveband range of 430 nm to 650 nm when a distance from the photographed object to the optical imaging lens group is 150 mm.
Figure 9B:
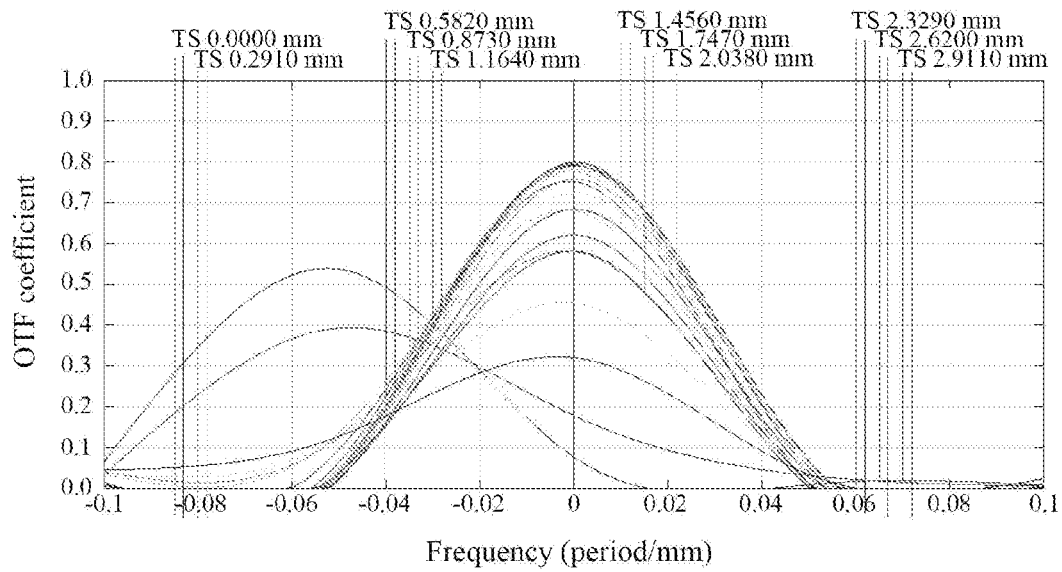
Figure 10A:
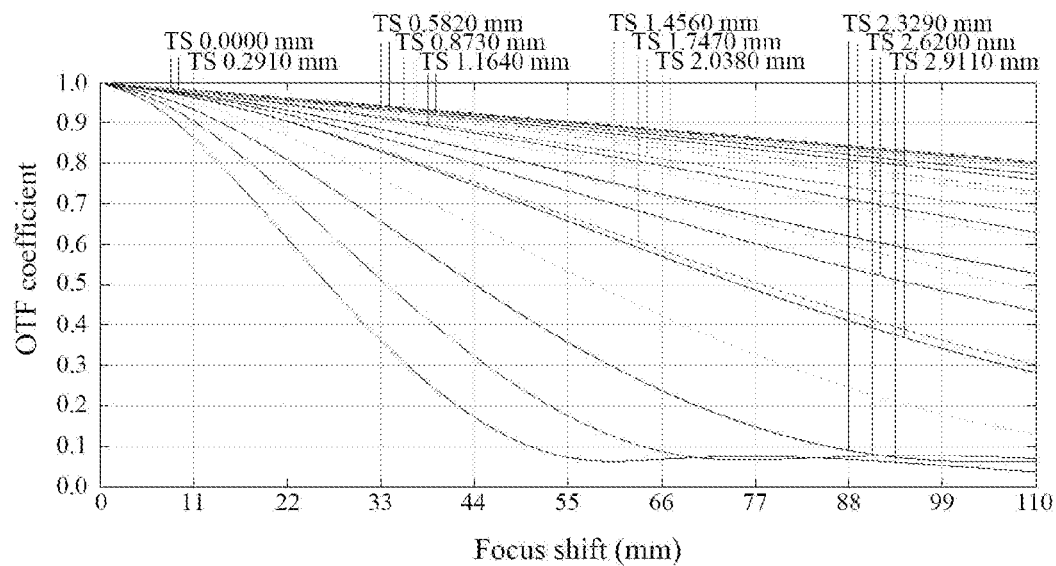
FIG. 10A and FIG. 10B respectively illustrate an MTF curve diagram and a focus shift curve diagram of the optical imaging lens group in Example 2 within a waveband range of 430 nm to 650 nm when a distance from the photographed object to the optical imaging lens group is infinite.
Figure 10B:
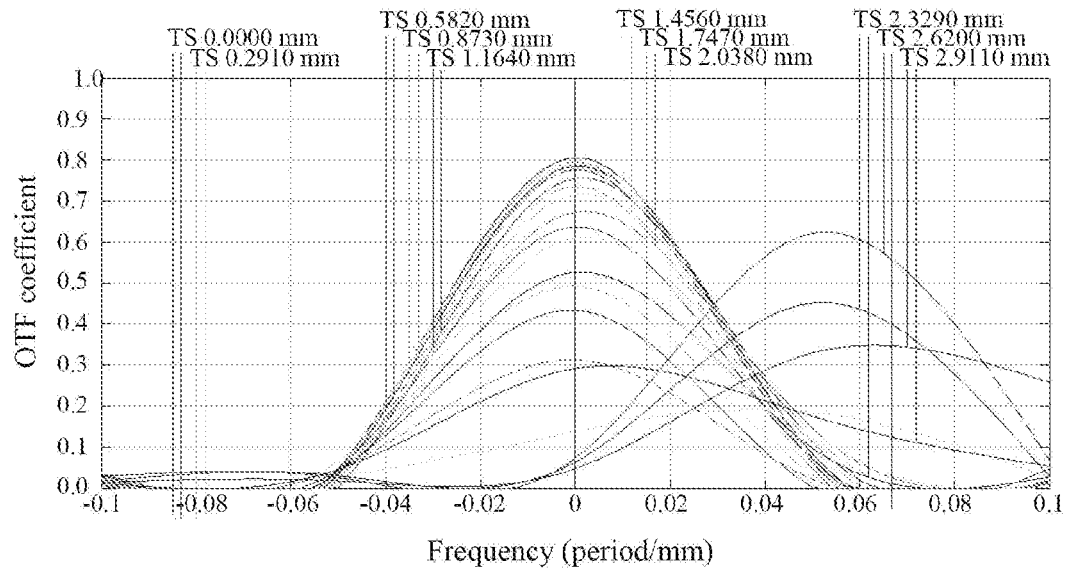

FIG. 7A illustrates the longitudinal aberration curve of the optical imaging lens group according to Example 2, representing deviations of focal points converged by light of different wavelengths after passing through the lens assembly. FIG. 7B illustrates the astigmatic curve of the optical imaging lens group according to Example 2, representing a curvature of a tangential plane and a curvature of a sagittal plane. FIG. 7C illustrates the distortion curve of the optical imaging lens group according to Example 2, representing the amounts of distortion corresponding to different image heights. FIG. 7D illustrates the lateral color curve of the optical imaging lens group according to Example 2, representing deviations of different heights of images on an imaging plane formed by light passing through the lens assembly. FIG. 8A, FIG. 9A and FIG. 10A respectively illustrate MTF curve diagrams of the optical imaging lens group in Example 2 within a waveband range of 430 nm to 650 nm, when the distance from the photographed object to the optical imaging lens group is 350 mm, 150 mm and infinite, representing pixel sizes of a tangential field-of-view and a sagittal field-of-view at different frequencies. FIG. 8B, FIG. 9B and FIG. 10B respectively illustrate focus shift curve diagrams of the optical imaging lens group in Example 2 within a waveband range of 430 nm to 650 nm, when the distance from the photographed object to the optical imaging lens group is 350 mm, 150 mm and infinite, representing pixel sizes of a tangential field-of-view and a sagittal field-of-view under different focal shifts. It can be seen from FIG. 7A to FIG. 10B that the optical imaging lens group provided in Example 2 can achieve good imaging quality.

Example 3

An optical imaging lens group according to Example 3 of the present disclosure is described below with reference to FIG. 11 to FIG. 15B. FIG. 11 illustrates a schematic structural diagram of the optical imaging lens group according to Example 3 of the present disclosure.

As shown in FIG. 11, the optical imaging lens group from an object side to an image side sequentially includes: an autofocus component T (including a light-transmitting module, a liquid material and a flexible film), a stop STO, a first lens E1, a second lens E2, a third lens E3, a fourth lens E4, a fifth lens E5, an optical filter E6 and an imaging plane S13.

The first lens E1 has a positive refractive power, an object-side surface S1 of the first lens is a convex surface, and an image-side surface S2 of the first lens is a concave surface. The second lens E2 has a negative refractive power, an object-side surface S3 of the second lens is a concave surface, and an image-side surface S4 of the second lens is a concave surface. The third lens E3 has a positive refractive power, an object-side surface S5 of the third lens is a concave surface, and an image-side surface S6 of the third lens is a convex surface. The fourth lens E4 has a positive refractive power, an object-side surface S7 of the fourth lens is a concave surface, and an image-side surface S8 of the fourth lens is a convex surface. The fifth lens E5 has a negative refractive power, an object-side surface S9 of the fifth lens is a concave surface, and an image-side surface S10 of the fifth lens is a concave surface. The optical filter E6 has an object-side surface S11 and an image-side surface S12. Light from an object sequentially passes through the light-transmitting module to the image-side surface S12 of the optical filter E6 and is finally imaged on the imaging plane S13.

In this example, a total effective focal length f of the optical imaging lens group is 4.23 mm, a total track length TTL of the optical imaging lens group is 4.83 mm, a half of a diagonal length ImgH of an effective pixel area on the imaging plane S13 of the optical imaging lens group is 3.01 mm, a half of a maximum field-of-view Semi-FOV of the optical imaging lens group is 34.4°, and an F number Fno of the optical imaging lens group is 2.38.

Table 5 is a table illustrating basic parameters of the optical imaging lens group of Example 3, where the units for the radius of curvature, the thickness/distance and the focal length are millimeter (mm). Table 6 shows high-order coefficients applicable to each aspheric surface in Example 3, where the surface shape of each aspheric surface may be defined by the formula (1) given in the above Example 1.

TABLE 5

| Surface number | Surface type | Radius of curvature | Thickness/ Distance | Material Refractive index | Abbe number | Focal length | Conic coefficient |
|---|---|---|---|---|---|---|---|
| OBJ | Spherical | infinite | D1 | | | | |
| | Spherical | infinite | 0.3000 | 1.52 | 64.2 | | |
| | Spherical | infinite | 0.2650 | 1.55 | 29.9 | | |
| | Spherical | RT | 0.0200 | 1.53 | 65.4 | | |
| | Spherical | | 0.4500 | | | | |
| STO | Spherical | infinite | −0.3371 | | | | |
| S1 | Aspheric | 1.3433 | 0.5734 | 1.55 | 56.1 | 2.71 | 0.0071 |
| S2 | Aspheric | 12.5526 | 0.1753 | | | | 39.1196 |
| S3 | Aspheric | −4.7235 | 0.2100 | 1.67 | 20.4 | −4.83 | −1.6333 |
| S4 | Aspheric | 10.3148 | 0.2976 | | | | 4.1545 |
| S5 | Aspheric | −13.8088 | 0.3129 | 1.64 | 23.5 | 24.93 | 90.0000 |
| S6 | Aspheric | −7.4932 | 0.5769 | | | | −4.9284 |
| S7 | Aspheric | −6.0326 | 0.9329 | 1.55 | 56.1 | 2.22 | −4.2102 |
| S8 | Aspheric | −1.0657 | 0.1290 | | | | −0.9966 |
| S9 | Aspheric | −7.8415 | 0.3517 | 1.54 | 55.8 | −1.74 | −0.9780 |
| S10 | Aspheric | 1.0762 | 0.5524 | | | | −0.9805 |
| S11 | Spherical | infinite | 0.2100 | 1.52 | 64.2 | | |
| S12 | Spherical | infinite | 0.5122 | | | | |
| S13 | Spherical | infinite | | | | | |

In this example, the light-transmitting module and the liquid material may be glued together. By changing the radius of curvature of a flexible film surface of the autofocus component T and the radius of curvature of an image-side surface of the liquid material, the total effective focal length of the optical imaging lens group may be changed with the change of a distance from the photographed object to the optical imaging lens group, thereby realizing the autofocus function of the optical imaging lens group. Specifically, when the distance D1 between the optical imaging lens group and the photographed object is 350 mm, the image-side surface of the autofocus component T is a plane, and the radius of curvature RT is infinite. When the distance D1 between the optical imaging lens group and the photographed object is 150 mm, the image-side surface of the autofocus component T is a concave surface, and the radius of curvature RT is 3.5150. When the distance D1 between the optical imaging lens group and the photographed object is infinite, the image-side surface of the autofocus component T is a convex surface, and the radius of curvature RT is −4.7100.

TABLE 6

| Surface number | A4 | A6 | A8 | A10 | A12 |
|---|---|---|---|---|---|
| S1 | −2.3798E−03 | −1.9269E−03 | −7.0325E−04 | −1.8124E−04 | −4.5498E−05 |
| S2 | −1.9438E−02 | −3.9799E−04 | −4.8354E−04 | −1.0847E−05 | 1.7036E−06 |
| S3 | 4.3948E−02 | 5.0978E−03 | −1.4519E−04 | 3.0597E−04 | 4.5355E−06 |
| S4 | 5.0849E−02 | 7.0578E−03 | 3.5919E−04 | 4.0445E−04 | 5.7974E−05 |
| S5 | −1.1498E−01 | −2.2072E−03 | −5.8848E−04 | 7.3581E−05 | 5.0269E−05 |
| S6 | −1.5858E−01 | 8.3300E−03 | 2.3514E−03 | 9.4627E−04 | 2.5380E−04 |
| S7 | −1.3416E−01 | 1.0041E−02 | 4.9749E−04 | −1.0654E−03 | 3.7786E−04 |
| S8 | 6.8300E−01 | −6.6889E−02 | 1.6354E−02 | −1.3576E−02 | 6.2060E−03 |
| S9 | −4.7165E−01 | 1.9875E−01 | −5.0744E−02 | 1.1553E−02 | −1.9201E−03 |
| S10 | −2.8603E+00 | 5.3580E−01 | −1.6426E−01 | 6.9228E−02 | −2.6878E−02 |

| Surface number | A14 | A16 | A18 | A20 |
|---|---|---|---|---|
| S1 | −6.5694E−06 | −2.4926E−06 | 5.2096E−07 | −6.7931E−07 |
| S2 | −6.1904E−08 | −6.4933E−07 | −7.6828E−07 | −5.4013E−07 |
| S3 | 5.3092E−06 | −3.6785E−08 | −2.9221E−07 | 2.8879E−08 |
| S4 | 8.1128E−07 | −1.6922E−05 | −1.9568E−05 | −1.5132E−05 |

TABLE 6-continued

| | | | | |
|---|---|---|---|---|
| S5 | 2.1064E−05 | 8.5965E−06 | 5.1286E−06 | 3.1042E−06 |
| S6 | 2.9202E−05 | −6.6468E−07 | −2.3458E−06 | 4.6720E−06 |
| S7 | −5.5347E−05 | −2.6765E−05 | −2.9203E−06 | 1.2796E−05 |
| S8 | −2.4132E−03 | 8.0739E−04 | −4.6244E−04 | 3.4095E−04 |
| S9 | −8.5388E−04 | 1.0218E−03 | −3.7125E−04 | 4.4517E−04 |
| S10 | 1.2098E−02 | −5.7385E−03 | 2.7096E−03 | −1.3238E−03 |

Figure 13B:
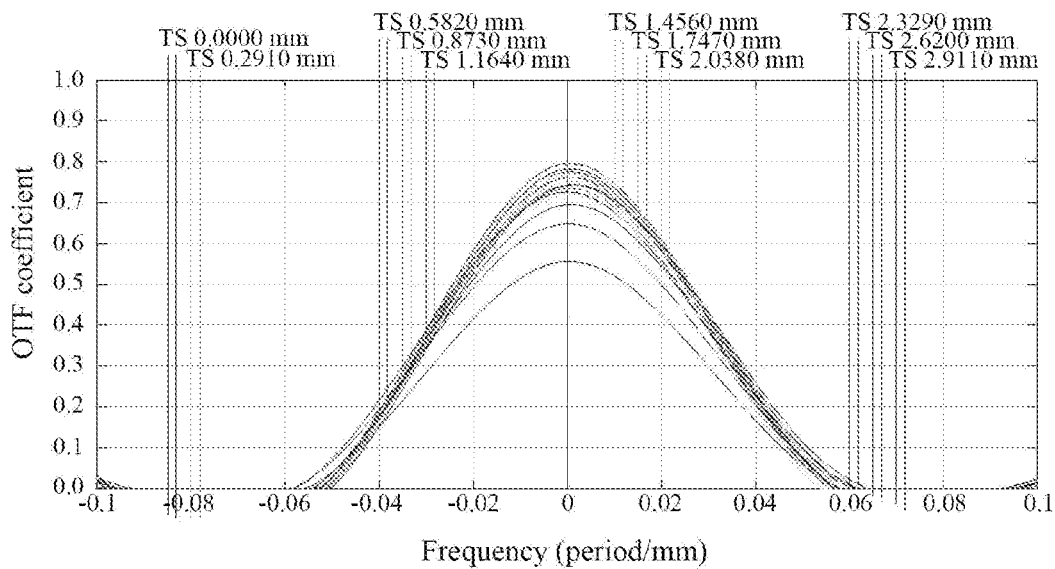
Figure 14A:
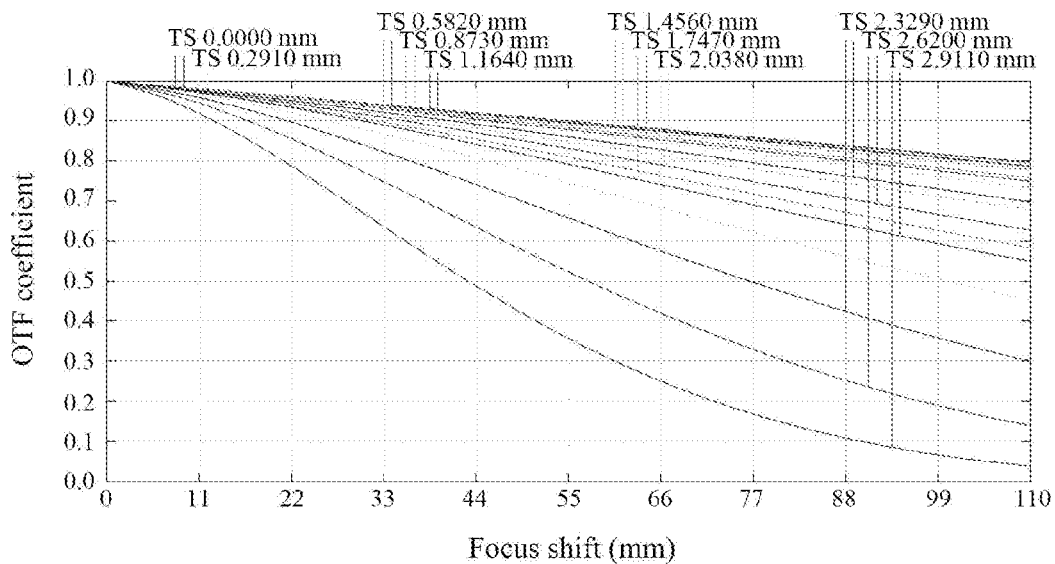
FIG. 14A and FIG. 14B respectively illustrate an MTF curve diagram and a focus shift curve diagram of the optical imaging lens group in Example 3 within a waveband range of 430 nm to 650 nm when a distance from the photographed object to the optical imaging lens group is 150 mm.
Figure 14B:
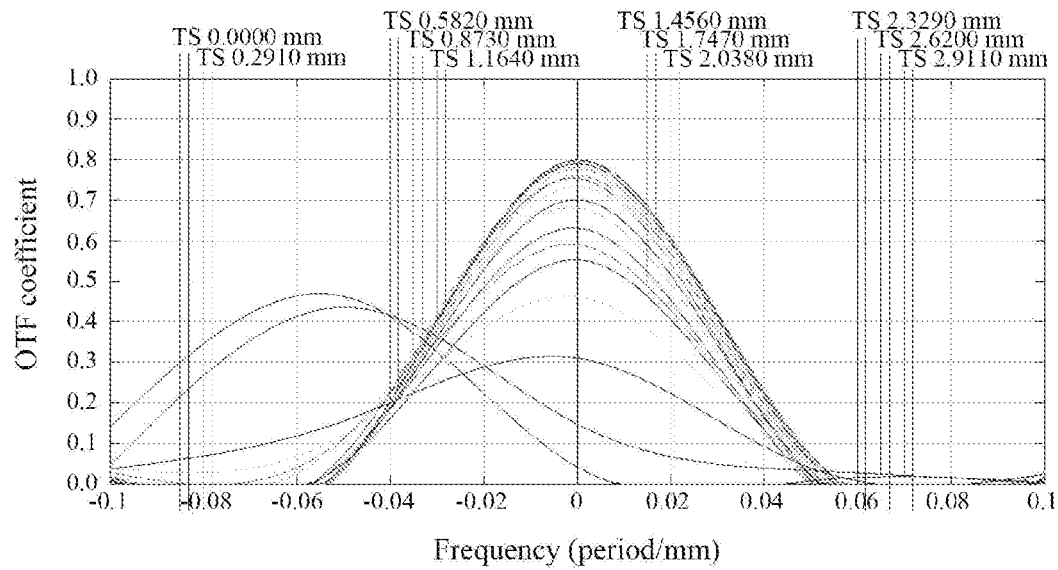
Figure 15A:
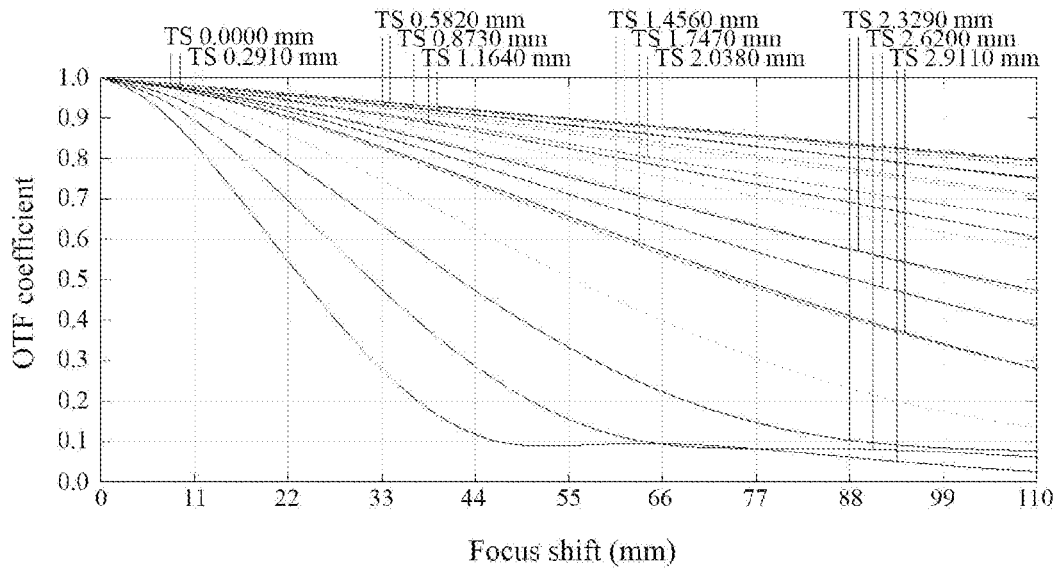
FIG. 15A and FIG. 15B respectively illustrate an MTF curve diagram and a focus shift curve diagram of the optical imaging lens group in Example 3 within a waveband range of 430 nm to 650 nm when a distance from the photographed object to the optical imaging lens group is infinite.
Figure 15B:
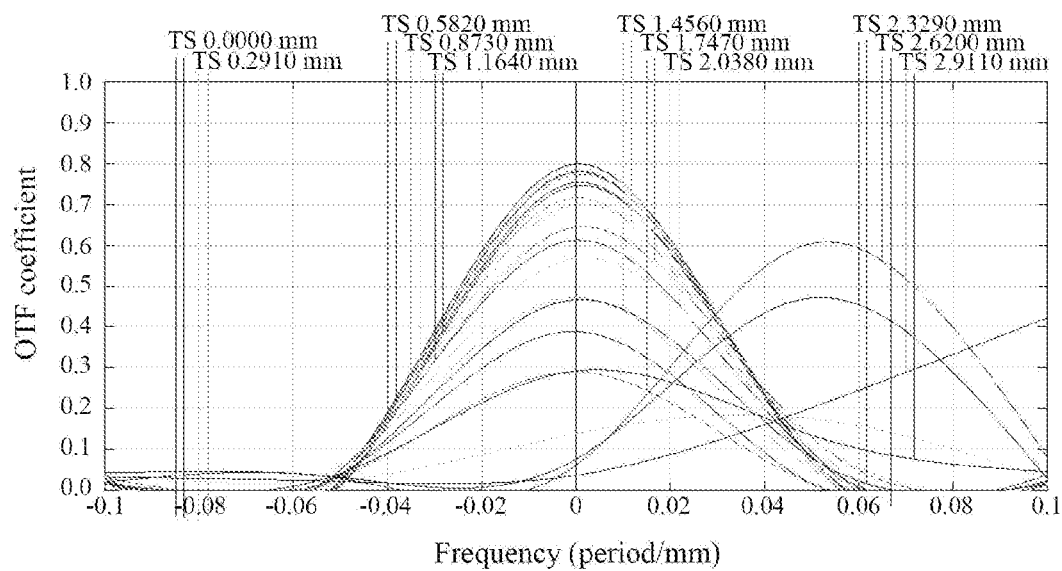

FIG. 12A illustrates the longitudinal aberration curve of the optical imaging lens group according to Example 3, representing deviations of focal points converged by light of different wavelengths after passing through the lens assembly. FIG. 12B illustrates the astigmatic curve of the optical imaging lens group according to Example 3, representing a curvature of a tangential plane and a curvature of a sagittal plane. FIG. 12C illustrates the distortion curve of the optical imaging lens group according to Example 3, representing the amounts of distortion corresponding to different image heights. FIG. 12D illustrates the lateral color curve of the optical imaging lens group according to Example 3, representing deviations of different heights of images on an imaging plane formed by light passing through the lens assembly. FIG. 13A, FIG. 14A and FIG. 15A respectively illustrate MTF curve diagrams of the optical imaging lens group in Example 3 within a waveband range of 430 nm to 650 nm, when the distance from the photographed object to the optical imaging lens group is 350 mm, 150 mm and infinite, representing pixel sizes of a tangential field-of-view and a sagittal field-of-view at different frequencies. FIG. 13B, FIG. 14B and FIG. 15B respectively illustrate focus shift curve diagrams of the optical imaging lens group in Example 3 within a waveband range of 430 nm to 650 nm, when the distance from the photographed object to the optical imaging lens group is 350 mm, 150 mm and infinite, representing pixel sizes of a tangential field-of-view and a sagittal field-of-view under different focal shifts. It can be seen from FIG. 12A to FIG. 15B that the optical imaging lens group provided in Example 3 can achieve good imaging quality.

Example 4

Figure 16:
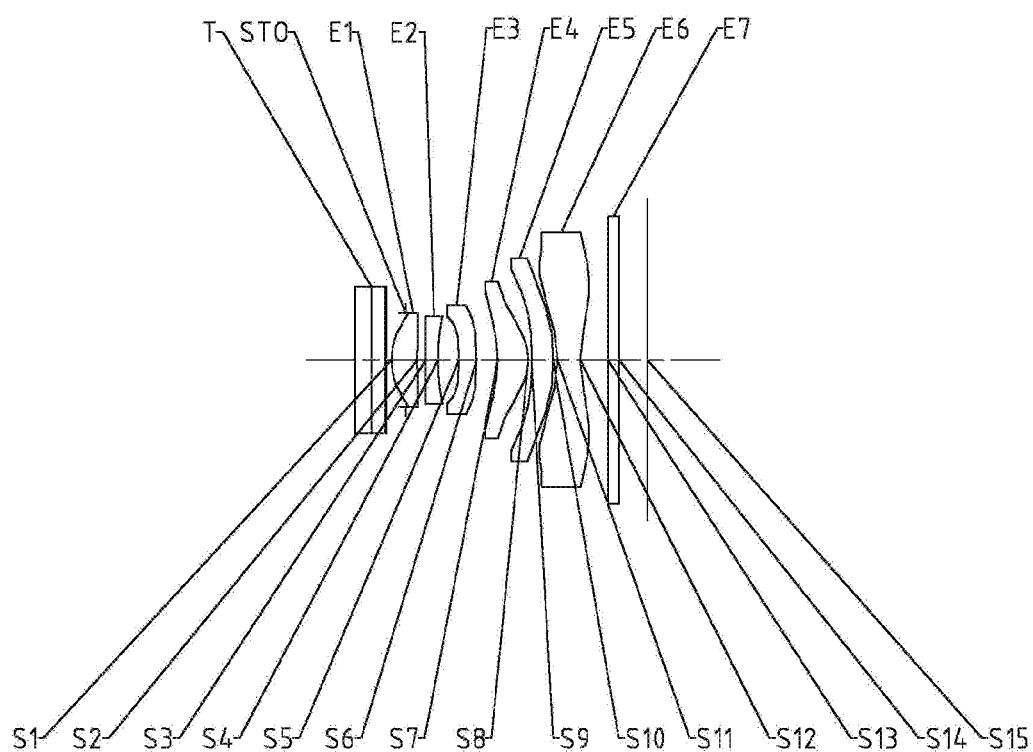
FIG. 16 is a schematic structural diagram illustrating an optical imaging lens group according to Example 4 of the present disclosure.

An optical imaging lens group according to Example 4 of the present disclosure is described below with reference to FIG. 16 to FIG. 20B. FIG. 16 illustrates a schematic structural diagram of the optical imaging lens group according to Example 4 of the present disclosure.

As shown in FIG. 16, the optical imaging lens group from an object side to an image side sequentially includes: an autofocus component T (including a light-transmitting module, a liquid material and a flexible film), a stop STO, a first lens E1, a second lens E2, a third lens E3, a fourth lens E4, a fifth lens E5, a sixth lens E6, an optical filter E7 and an imaging plane S15.

The first lens E1 has a positive refractive power, an object-side surface S1 of the first lens is a convex surface, and an image-side surface S2 of the first lens is a concave surface. The second lens E2 has a negative refractive power, an object-side surface S3 of the second lens is a concave surface, and an image-side surface S4 of the second lens is a concave surface. The third lens E3 has a negative refractive power, an object-side surface S5 of the third lens is a concave surface, and an image-side surface S6 of the third lens is a convex surface. The fourth lens E4 has a positive refractive power, an object-side surface S7 of the fourth lens is a concave surface, and an image-side surface S8 of the fourth lens is a convex surface. The fifth lens E5 has a positive refractive power, an object-side surface S9 of the fifth lens is a convex surface, and an image-side surface S10 of the fifth lens is a convex surface. The sixth lens E6 has a negative refractive power, an object-side surface S11 of the sixth lens is a concave surface, and an image-side surface S12 of the sixth lens is a concave surface. The optical filter E7 has an object-side surface S13 and an image-side surface S14. Light from an object sequentially passes through the light-transmitting module to the image-side surface S14 of the optical filter E7 and is finally imaged on the imaging plane S15.

In this example, a total effective focal length f of the optical imaging lens group is 3.98 mm, a total track length TTL of the optical imaging lens group is 4.84 mm, a half of a diagonal length ImgH of an effective pixel area on the imaging plane S15 of the optical imaging lens group is 3.01 mm, a half of a maximum field-of-view Semi-FOV of the optical imaging lens group is 36.0°, and an F number Fno of the optical imaging lens group is 2.34.

Table 7 is a table illustrating basic parameters of the optical imaging lens group of Example 4, where the units for the radius of curvature, the thickness/distance and the focal length are millimeter (mm). Table 8 shows high-order coefficients applicable to each aspheric surface in Example 4, where the surface shape of each aspheric surface may be defined by the formula (1) given in the above Example 1.

TABLE 7

| | | | | Material | | | |
|---|---|---|---|---|---|---|---|
| Surface number | Surface type | Radius of curvature | Thickness/ Distance | Refractive index | Abbe number | Focal length | Conic coefficient |
| OBJ | Spherical | infinite | D1 | | | | |
| | Spherical | infinite | 0.3000 | 1.52 | 64.2 | | |
| | Spherical | infinite | 0.2650 | 1.55 | 29.9 | | |
| | Spherical | RT | 0.0200 | 1.53 | 65.4 | | |
| | Spherical | | 0.3689 | | | | |
| STO | Spherical | infinite | −0.2689 | | | | |
| S1 | Aspheric | 1.3742 | 0.4908 | 1.55 | 56.1 | 2.72 | −0.0074 |
| S2 | Aspheric | 15.8644 | 0.1607 | | | | 90.0000 |
| S3 | Aspheric | −6.8755 | 0.2300 | 1.67 | 20.4 | −6.08 | 9.1520 |

TABLE 7-continued

| Surface number | Surface type | Radius of curvature | Thickness/ Distance | Material Refractive index | Abbe number | Focal length | Conic coefficient |
|---|---|---|---|---|---|---|---|
| S4 | Aspheric | 9.9807 | 0.3959 | | | | −90.0000 |
| S5 | Aspheric | −8.4844 | 0.3325 | 1.64 | 23.5 | −25.84 | 88.9701 |
| S6 | Aspheric | −17.5613 | 0.4000 | | | | −90.0000 |
| S7 | Aspheric | −2.2426 | 0.5800 | 1.55 | 56.1 | 2.43 | −24.6372 |
| S8 | Aspheric | −0.9091 | 0.0600 | | | | −1.0833 |
| S9 | Aspheric | 74.8991 | 0.4100 | 1.55 | 56.1 | 12.03 | 90.0000 |
| S10 | Aspheric | −7.1842 | 0.0829 | | | | 12.6310 |
| S11 | Aspheric | −1.5932 | 0.4300 | 1.54 | 55.8 | −1.88 | −29.2451 |
| S12 | Aspheric | 3.0199 | 0.5258 | | | | −0.4793 |
| S13 | Spherical | infinite | 0.2100 | 1.52 | 64.2 | | |
| S14 | Spherical | infinite | 0.5341 | | | | |
| S15 | Spherical | infinite | | | | | |

In this example, the light-transmitting module and the liquid material may be glued together. By changing the radius of curvature of a flexible film surface of the autofocus component T and the radius of curvature of an image-side surface of the liquid material, the total effective focal length of the optical imaging lens group may be changed with the change of a distance from the photographed object to the optical imaging lens group, thereby realizing the autofocus function of the optical imaging lens group. Specifically, when the distance D1 between the optical imaging lens group and the object is 350 mm, the image-side surface of the autofocus component T is a plane, and the radius of curvature RT is infinite. When the distance D1 between the optical imaging lens group and the object is 150 mm, the image-side surface of the autofocus component T is a concave surface, and the radius of curvature RT is 3.4350. When the distance D1 between the optical imaging lens group and the object is infinite, the image-side surface of the autofocus component T is a convex surface, and the radius of curvature RT is −4.8300.

Figure 17A:
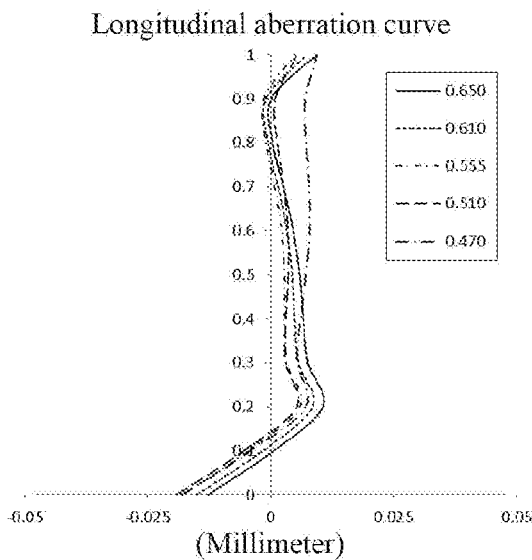
FIGS. 17A-17D respectively illustrate a longitudinal aberration curve, an astigmatic curve, a distortion curve and a lateral color curve of the optical imaging lens group according to Example 4.
Figure 17B:
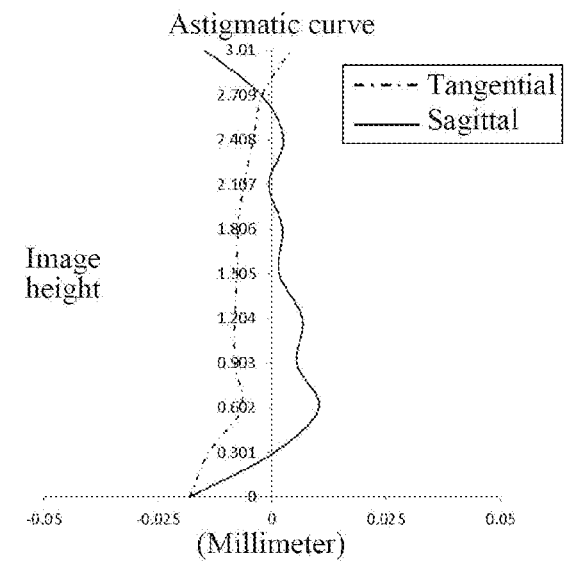
Figure 17C:
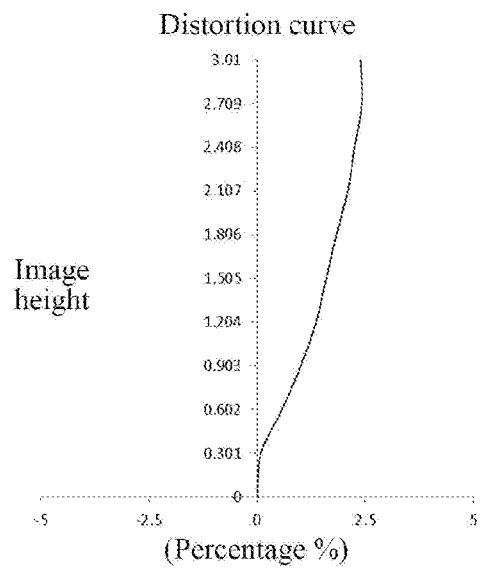
Figure 17D:
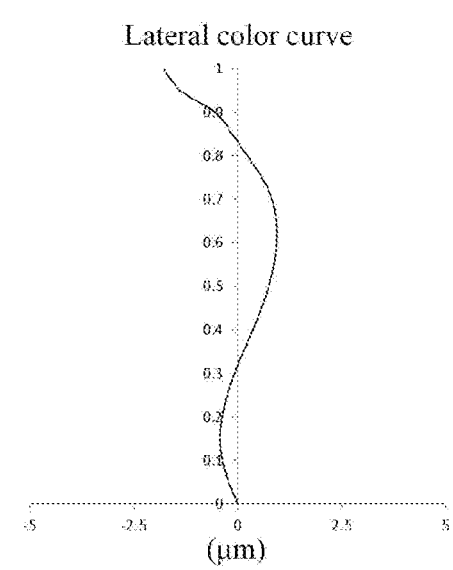
Figure 18A:
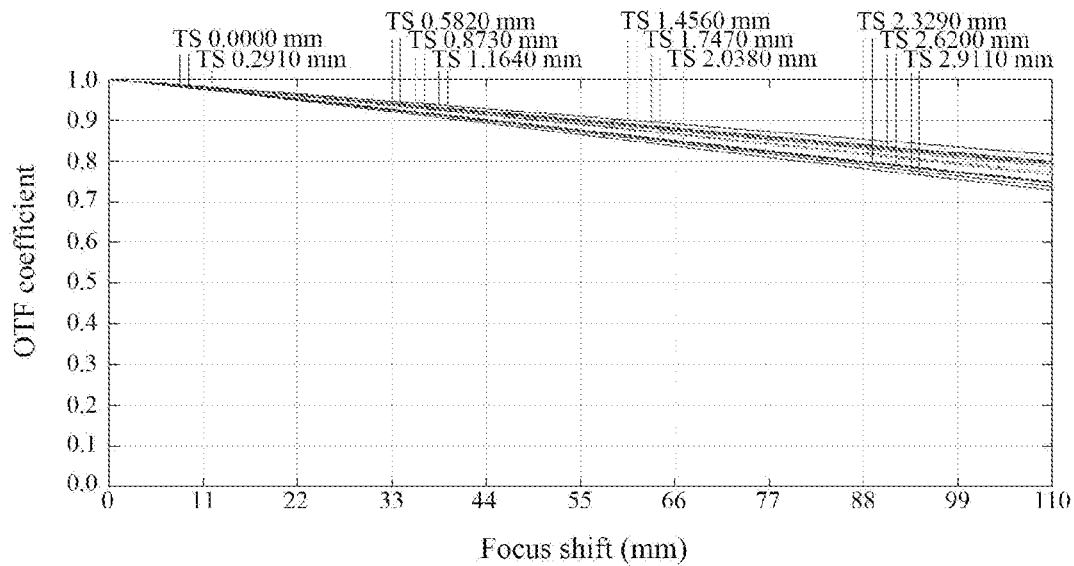
FIG. 18A and FIG. 18B respectively illustrate a modulation transfer function (MTF) curve diagram and a focus shift curve diagram of the optical imaging lens group in Example 4 within a waveband range of 430 nm to 650 nm when a distance from the photographed object to the optical imaging lens group is 350 mm.
Figure 18B:
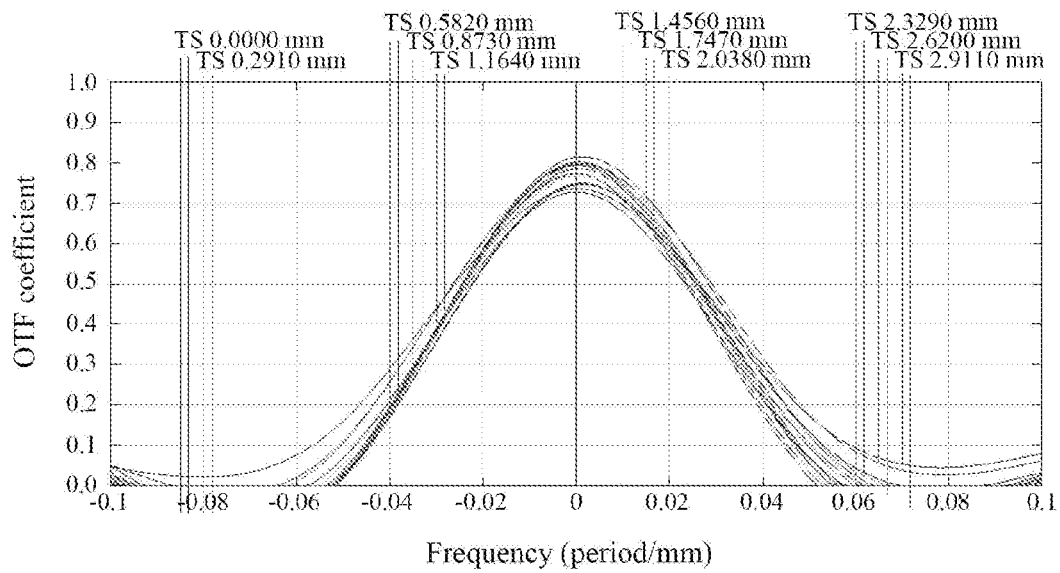
Figure 19A:
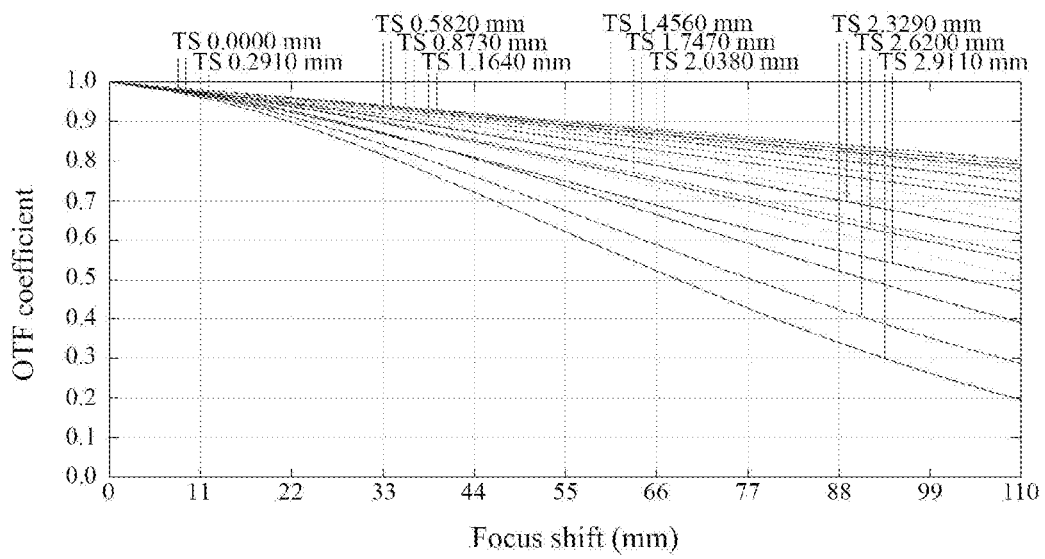
FIG. 19A and FIG. 19B respectively illustrate an MTF curve diagram and a focus shift curve diagram of the optical imaging lens group in Example 4 within a waveband range of 430 nm to 650 nm when a distance from the photographed object to the optical imaging lens group is 150 mm.
Figure 19B:
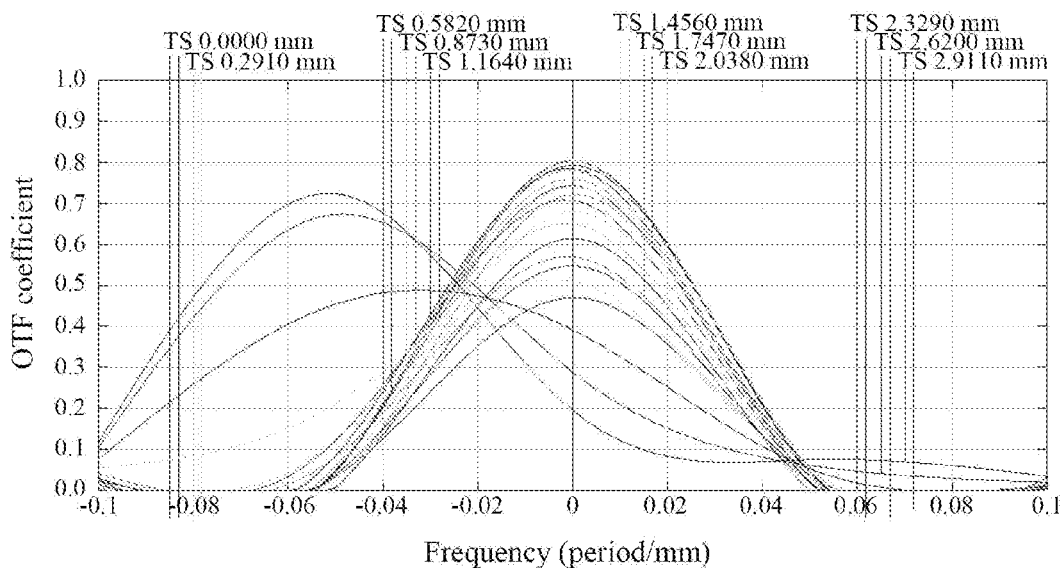
Figure 20A:
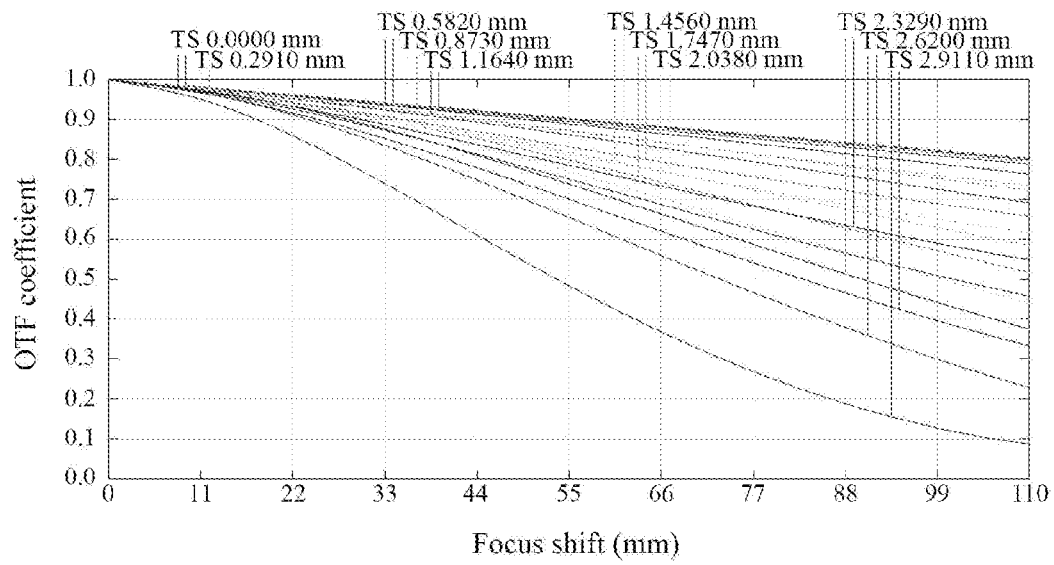
FIG. 20A and FIG. 20B respectively illustrate an MTF curve diagram and a focus shift curve diagram of the optical imaging lens group in Example 4 within a waveband range of 430 nm to 650 nm when a distance from the photographed object to the optical imaging lens group is infinite.
Figure 20B:
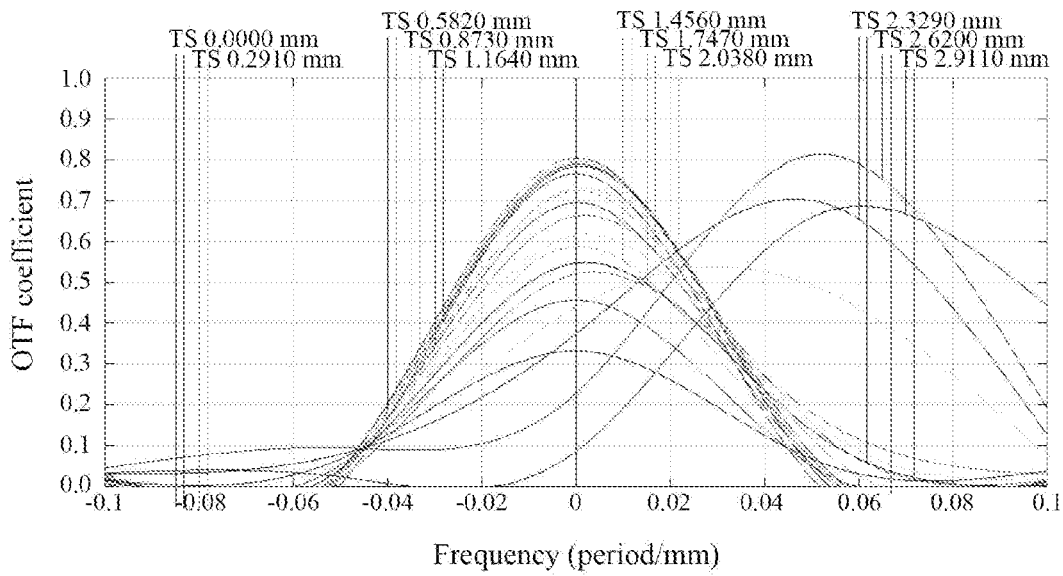

FIG. 17A illustrates the longitudinal aberration curve of the optical imaging lens group according to Example 4, representing deviations of focal points converged by light of different wavelengths after passing through the lens assembly. FIG. 17B illustrates the astigmatic curve of the optical imaging lens group according to Example 4, representing a curvature of a tangential plane and a curvature of a sagittal plane. FIG. 17C illustrates the distortion curve of the optical imaging lens group according to Example 4, representing the amounts of distortion corresponding to different image heights. FIG. 17D illustrates the lateral color curve of the optical imaging lens group according to Example 4, representing deviations of different heights of images on an imaging plane formed by light passing through the lens assembly. FIG. 18A, FIG. 19A and FIG. 20A respectively illustrate MTF curve diagrams of the optical imaging lens group in Example 4 within a waveband range of 430 nm to 650 nm of the optical imaging lens group, when the distance from the photographed object to the optical imaging lens group is 350 mm, 150 mm and infinite, representing pixel sizes of a tangential field-of-view and a sagittal field-of-view at different frequencies. FIG. 18B, FIG. 19B and FIG. 20B

TABLE 8

| Surface number | A4 | A6 | A8 | A10 | A12 |
|---|---|---|---|---|---|
| S1 | −3.8124E−03 | −4.0536E−03 | −1.6862E−03 | −4.8782E−04 | −1.5085E−04 |
| S2 | −1.6132E−02 | −4.8945E−03 | −1.1293E−03 | −2.1444E−04 | −7.7737E−05 |
| S3 | 4.3423E−02 | 2.9980E−03 | 7.5809E−04 | 2.3997E−04 | 4.6166E−05 |
| S4 | 3.5703E−02 | 2.2862E−03 | 3.3699E−04 | 3.8816E−05 | 4.7382E−06 |
| S5 | −1.1512E−01 | −3.6802E−03 | −1.2295E−04 | −2.0678E−05 | −2.6415E−05 |
| S6 | −1.3920E−01 | 3.8114E−03 | 2.2628E−03 | 7.5209E−05 | 1.4699E−04 |
| S7 | −6.3761E−02 | 2.6516E−02 | −7.8205E−03 | −9.5786E−04 | 1.4850E−03 |
| S8 | 7.8381E−01 | −6.3912E−02 | −7.3406E−03 | −5.6085E−03 | 8.1283E−03 |
| S9 | −4.3042E−01 | 7.7505E−02 | −1.4891E−02 | 8.3824E−03 | −8.2498E−04 |
| S10 | −2.0988E−01 | 1.3077E−01 | −2.8844E−02 | 9.7391E−03 | 5.9807E−04 |
| S11 | −1.8482E−02 | 1.4198E−01 | −5.7202E−02 | 5.8015E−03 | 5.6017E−03 |
| S12 | −1.9995E+00 | 3.4512E−01 | −8.2659E−03 | −6.5087E−03 | 2.7422E−02 |

| Surface number | A14 | A16 | A18 | A20 |
|---|---|---|---|---|
| S1 | −2.7802E−05 | −1.4428E−05 | −1.0355E−07 | −3.3779E−06 |
| S2 | −6.5722E−05 | −5.9534E−05 | −5.4910E−05 | −4.4354E−05 |
| S3 | 1.6359E−05 | 1.1465E−05 | 1.1769E−05 | 1.2850E−05 |
| S4 | −1.6383E−05 | −3.1138E−07 | −7.5406E−06 | 1.0616E−06 |
| S5 | −5.8959E−06 | −1.9578E−05 | 5.8511E−06 | −6.3647E−06 |
| S6 | −1.7081E−05 | 4.2878E−06 | −1.4785E−06 | −6.8419E−07 |
| S7 | −1.2105E−04 | 3.1662E−05 | 9.7450E−08 | −1.2193E−06 |
| S8 | −4.2558E−03 | 2.0157E−03 | 2.9146E−05 | 9.4987E−04 |
| S9 | −1.2451E−03 | 1.4659E−03 | −1.9894E−03 | 1.0686E−03 |
| S10 | 2.0260E−04 | −7.5642E−04 | −1.2243E−03 | 5.7743E−04 |
| S11 | −8.2008E−03 | 5.1109E−03 | −9.7492E−04 | −7.3773E−04 |
| S12 | −7.4687E−03 | 7.5221E−03 | −1.1668E−02 | 5.6433E−03 | respectively illustrate focus shift curve diagrams of the optical imaging lens group in Example 4 within a waveband range of 430 nm to 650 nm, when the distance from the photographed object to the optical imaging lens group is 350 mm, 150 mm and infinite, representing pixel sizes of a tangential field-of-view and a sagittal field-of-view under different focal shifts. It can be seen from FIG. 17A to FIG. 20B that the optical imaging lens group provided in Example 4 can achieve good imaging quality.

Example 5

Figure 21:
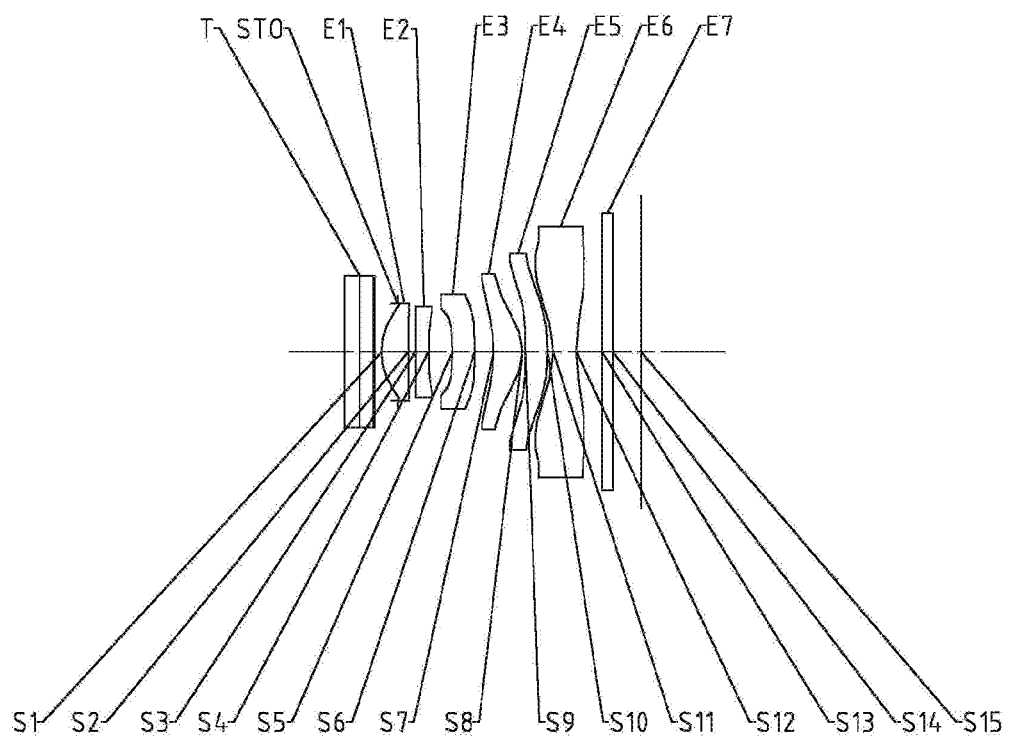
FIG. 21 is a schematic structural diagram illustrating an optical imaging lens group according to Example 5 of the present disclosure.

An optical imaging lens group according to Example 5 of the present disclosure is described below with reference to FIG. 21 to FIG. 25B. FIG. 21 illustrates a schematic structural diagram of the optical imaging lens group according to Example 5 of the present disclosure.

As shown in FIG. 21, the optical imaging lens group from an object side to an image side sequentially includes: an autofocus component T (including a light-transmitting module, a liquid material and a flexible film), a stop STO, a first lens E1, a second lens E2, a third lens E3, a fourth lens E4, a fifth lens E5, a sixth lens E6, an optical filter E7 and an imaging plane S15.

The first lens E1 has a positive refractive power, an object-side surface S1 of the first lens is a convex surface, and an image-side surface S2 of the first lens is a concave surface. The second lens E2 has a negative refractive power, an object-side surface S3 of the second lens is a concave surface, and an image-side surface S4 of the second lens is a concave surface. The third lens E3 has a negative refractive power, an object-side surface S5 of the third lens is a concave surface, and an image-side surface S6 of the third lens is a concave surface. The fourth lens E4 has a positive refractive power, an object-side surface S7 of the fourth lens is a concave surface, and an image-side surface S8 of the fourth lens is a convex surface. The fifth lens E5 has a positive refractive power, an object-side surface S9 of the fifth lens is a convex surface, and an image-side surface S10 of the fifth lens is a convex surface. The sixth lens E6 has a negative refractive power, an object-side surface S11 of the sixth lens is a concave surface, and an image-side surface S12 of the sixth lens is a concave surface. The optical filter E7 has an object-side surface S13 and an image-side surface S14. Light from an object sequentially passes through the light-transmitting module to the image-side surface S14 of the optical filter E7 and is finally imaged on the imaging plane S15.

In this example, a total effective focal length f of the optical imaging lens group is 4.22 mm, a total track length TTL of the optical imaging lens group is 5.05 mm, a half of a diagonal length ImgH of an effective pixel area on the imaging plane S15 of the optical imaging lens group is 3.01 mm, a half of a maximum field-of-view Semi-FOV of the optical imaging lens group is 34.4°, and an F number Fno of the optical imaging lens group is 2.34.

Table 9 is a table illustrating basic parameters of the optical imaging lens group of Example 5, where the units for the radius of curvature, the thickness/distance and the focal length are millimeter (mm). Table 10 shows high-order coefficients applicable to each aspheric surface in Example 5, where the surface shape of each aspheric surface may be defined by the formula (1) given in the above Example 1.

TABLE 9

| Surface number | Surface type | Radius of curvature | Thickness/ Distance | Refractive index | Abbe number | Focal length | Conic coefficient |
|---|---|---|---|---|---|---|---|
| OBJ | Spherical | infinite | D1 | | | | |
|  | Spherical | infinite | 0.3000 | 1.52 | 64.2 | | |
|  | Spherical | infinite | 0.2650 | 1.55 | 29.9 | | |
|  | Spherical | RT | 0.0200 | 1.53 | 65.4 | | |
|  | Spherical | | 0.4500 | | | | |
| STO | Spherical | infinite | −0.3070 | | | | |
| S1 | Aspheric | 1.3906 | 0.5163 | 1.55 | 56.1 | 2.82 | 0.0091 |
| S2 | Aspheric | 12.6435 | 0.1472 | | | | 90.0000 |
| S3 | Aspheric | −8.6876 | 0.2500 | 1.67 | 20.4 | −6.60 | 33.7433 |
| S4 | Aspheric | 9.0114 | 0.4624 | | | | −90.0000 |
| S5 | Aspheric | −11.6868 | 0.4359 | 1.64 | 23.5 | −14.35 | 76.0225 |
| S6 | Aspheric | 45.0000 | 0.3669 | | | | 90.0000 |
| S7 | Aspheric | −2.7081 | 0.5600 | 1.55 | 56.1 | 2.60 | −26.5430 |
| S8 | Aspheric | −0.9992 | 0.0600 | | | | −1.0443 |
| S9 | Aspheric | 31.2761 | 0.4300 | 1.55 | 56.1 | 10.64 | 90.0000 |
| S10 | Aspheric | −7.0963 | 0.1109 | | | | 12.4380 |
| S11 | Aspheric | −1.3540 | 0.4500 | 1.54 | 55.8 | −1.99 | −16.4997 |
| S12 | Aspheric | 5.6119 | 0.5007 | | | | 0.2009 |
| S13 | Spherical | infinite | 0.2100 | 1.52 | 64.2 | | |
| S14 | Spherical | infinite | 0.5462 | | | | |
| S15 | Spherical | infinite | | | | | |

In this example, the light-transmitting module and the liquid material may be glued together. By changing the radius of curvature of a flexible film surface of the autofocus component T and the radius of curvature of an image-side surface of the liquid material, the total effective focal length of the optical imaging lens group may be changed with the change of a distance from the photographed object to the optical imaging lens group, thereby realizing the autofocus function of the optical imaging lens group. Specifically, when the distance D1 between the optical imaging lens group and the photographed object is 350 mm, the image-side surface of the autofocus component T is a plane, and the radius of curvature RT is infinite. When the distance D1 between the optical imaging lens group and the object is 150 mm, the image-side surface of the autofocus component T is a concave surface, and the radius of curvature RT is 3.5350. When the distance D1 between the optical imaging lens group and the photographed object is infinite, the image-side surface of the autofocus component T is a convex surface, and the radius of curvature RT is −4.7300.

TABLE 10

| Surface number | A4 | A6 | A8 | A10 | A12 |
|---|---|---|---|---|---|
| S1 | −3.5223E−03 | −2.8094E−03 | −1.0902E−03 | −3.0330E−04 | −8.6608E−05 |
| S2 | −1.5044E−02 | −3.3929E−03 | −1.1067E−03 | −1.7004E−04 | −2.2405E−05 |
| S3 | 3.8650E−02 | 3.2815E−03 | 3.7777E−05 | 1.2749E−04 | 6.0163E−06 |
| S4 | 3.1072E−02 | 2.2258E−03 | −1.8081E−04 | −4.1378E−05 | −3.1654E−05 |
| S5 | −1.1004E−01 | −3.8918E−03 | −5.6170E−04 | −1.5578E−04 | −4.2846E−05 |
| S6 | −1.4062E−01 | 4.1913E−03 | 1.4322E−03 | −3.5639E−05 | 8.2752E−05 |
| S7 | −6.5399E−02 | 2.9617E−02 | −4.8111E−03 | −1.2146E−03 | 1.8629E−03 |
| S8 | 7.5937E−01 | −4.6292E−02 | −9.2227E−03 | −2.9693E−04 | 4.8198E−03 |
| S9 | −4.1838E−01 | 8.8636E−02 | −1.6062E−02 | 8.6361E−03 | −5.3878E−04 |
| S10 | −1.8184E−01 | 1.3851E−01 | −2.9634E−02 | 1.0450E−02 | 1.1966E−03 |
| S11 | 1.2799E−01 | 1.0355E−01 | −4.5414E−02 | 1.1051E−02 | 4.5263E−03 |
| S12 | −7.7876E−01 | 1.6102E−01 | 7.0644E−02 | −2.0022E−02 | 4.0039E−02 |

| Surface number | A14 | A16 | A18 | A20 |
|---|---|---|---|---|
| S1 | −1.3794E−05 | −5.4402E−06 | 1.3643E−06 | −9.0317E−07 |
| S2 | −6.2050E−06 | −5.3523E−07 | −2.0131E−06 | 1.5964E−07 |
| S3 | −3.0891E−07 | −1.4665E−06 | −1.3494E−06 | 6.9748E−08 |
| S4 | −1.5802E−05 | −2.1550E−06 | −3.6293E−06 | 3.2686E−07 |
| S5 | −2.0126E−05 | −7.8272E−06 | 3.4225E−07 | −1.5481E−06 |
| S6 | −1.7477E−05 | 6.5526E−06 | −2.4908E−06 | −2.3462E−06 |
| S7 | −4.0864E−04 | 2.3468E−06 | −9.4406E−05 | −1.5225E−05 |
| S8 | −4.9305E−03 | 2.1750E−03 | 3.0331E−04 | 9.8914E−04 |
| S9 | −9.1960E−04 | 1.9430E−03 | −2.1760E−03 | 9.4891E−04 |
| S10 | −2.6045E−04 | −5.4235E−04 | −7.4868E−04 | 6.2402E−04 |
| S11 | −4.8070E−03 | 4.3540E−03 | −8.3220E−04 | −2.5657E−03 |
| S12 | −1.6415E−02 | 8.1881E−03 | −1.0257E−02 | 6.5396E−03 |

Figure 22A:
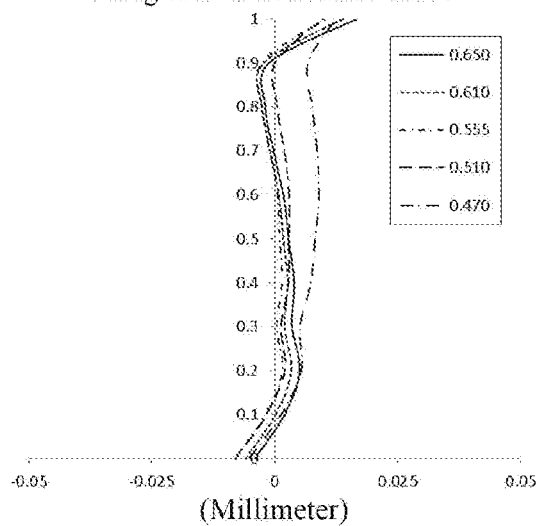
FIGS. 22A-22D respectively illustrate a longitudinal aberration curve, an astigmatic curve, a distortion curve and a lateral color curve of the optical imaging lens group according to Example 5.
Figure 22B:
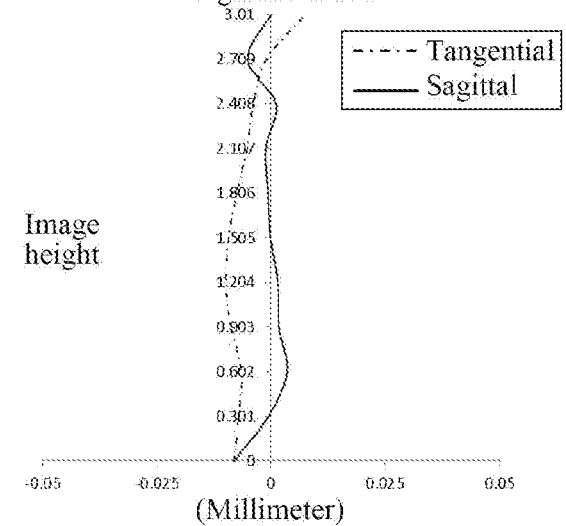
Figures 22C, 22D:
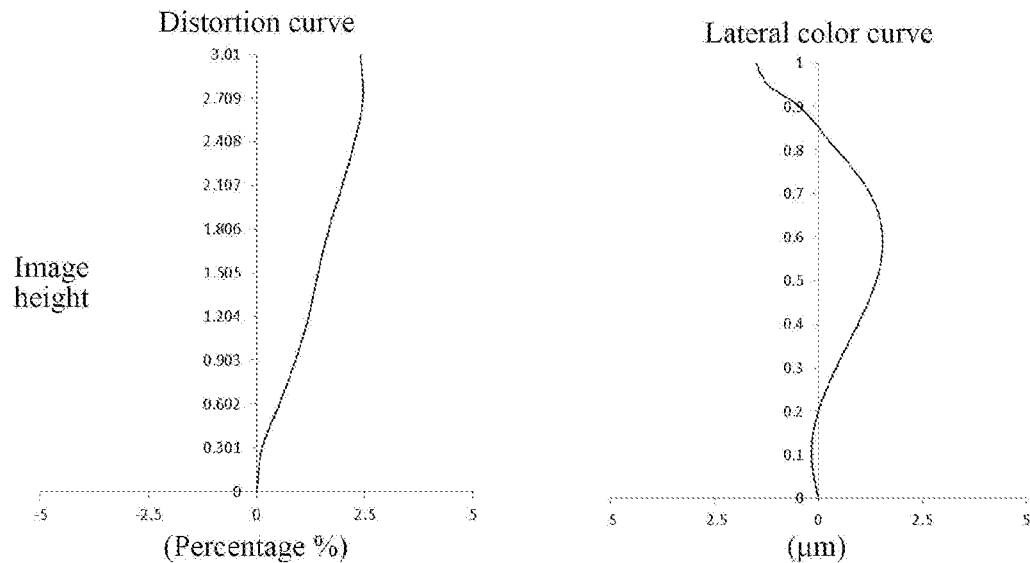
Figure 23A:
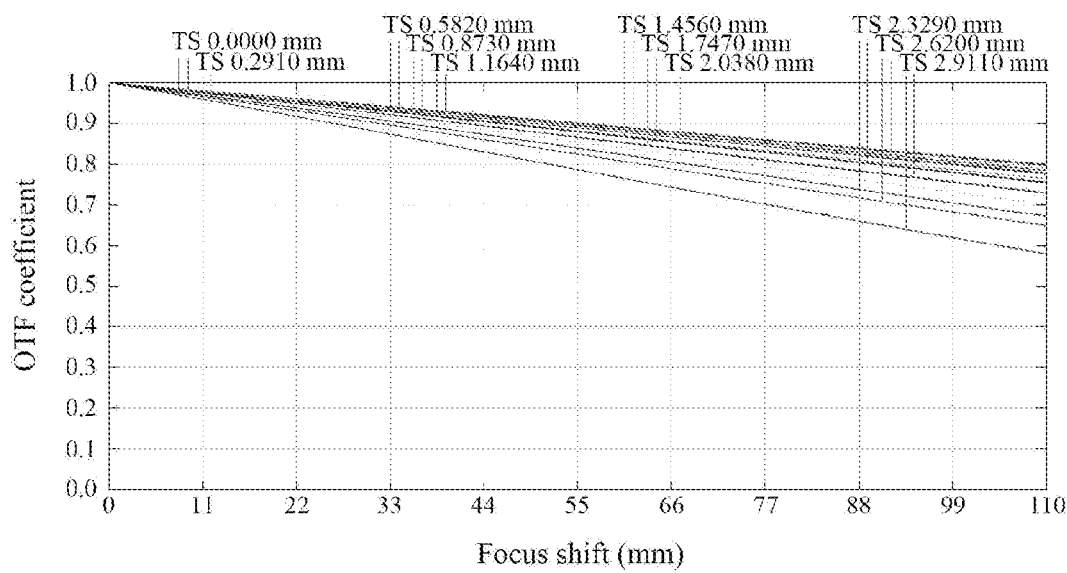
FIG. 23A and FIG. 23B respectively illustrate a modulation transfer function (MTF) curve diagram and a focus shift curve diagram of the optical imaging lens group in Example 5 within a waveband range of 430 nm to 650 nm when a distance from the photographed object to the optical imaging lens group is 350 mm.
Figure 23B:
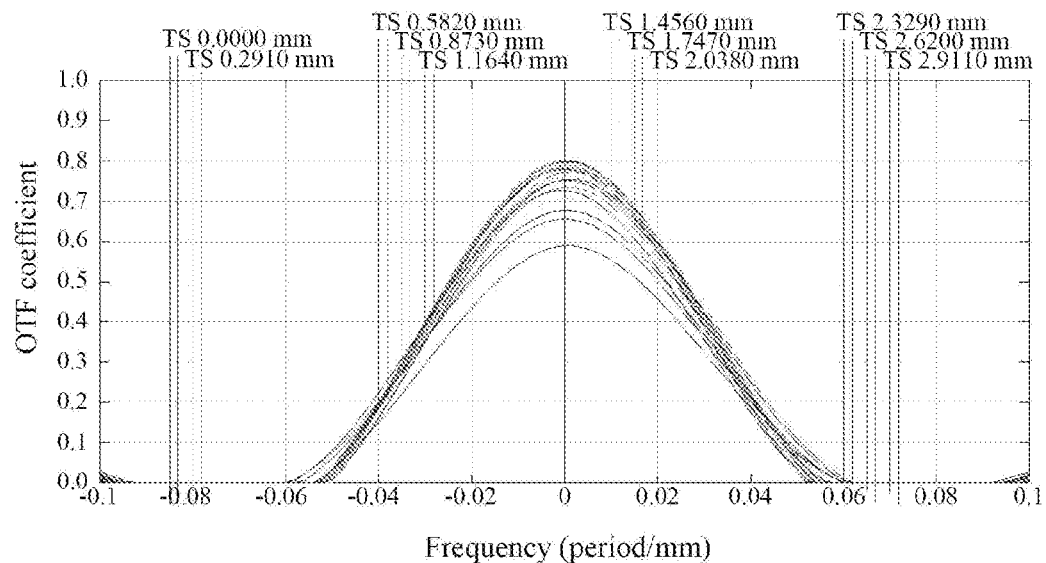
Figure 24A:
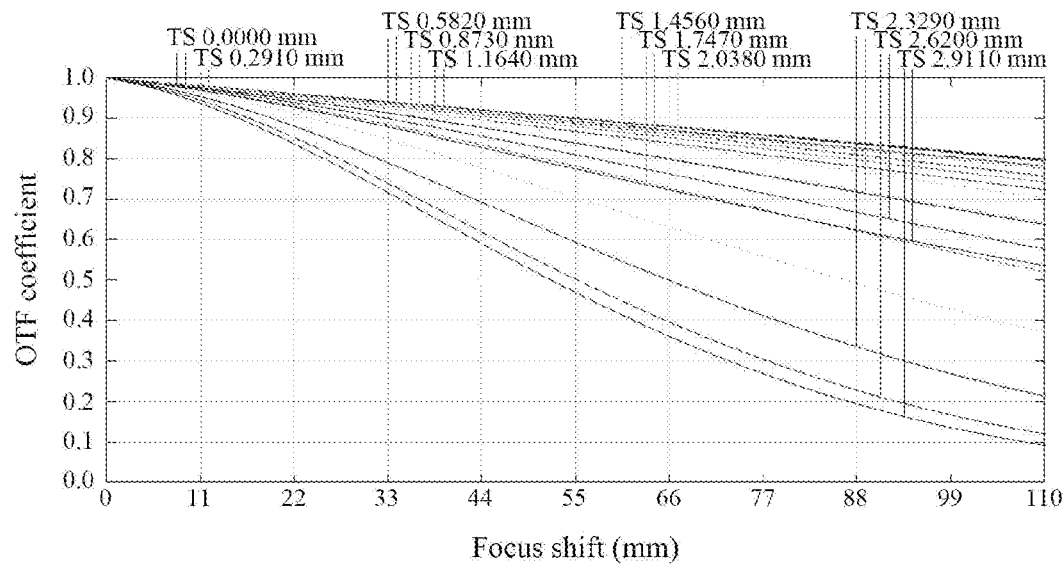
FIG. 24A and FIG. 24B respectively illustrate an MTF curve diagram and a focus shift curve diagram of the optical imaging lens group in Example 5 within a waveband range of 430 nm to 650 nm when a distance from the photographed object to the optical imaging lens group is 150 mm.
Figure 24B:
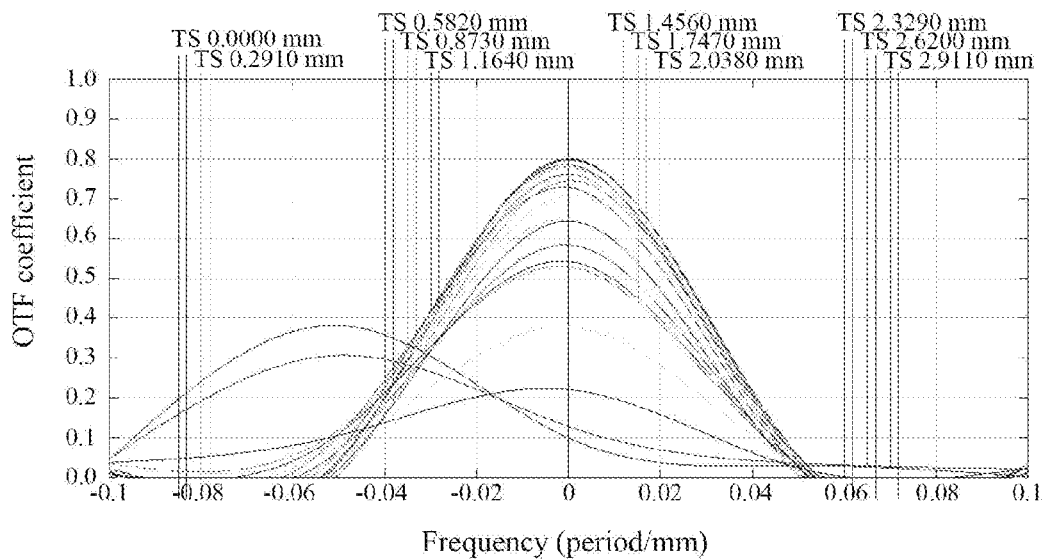
Figure 25A:
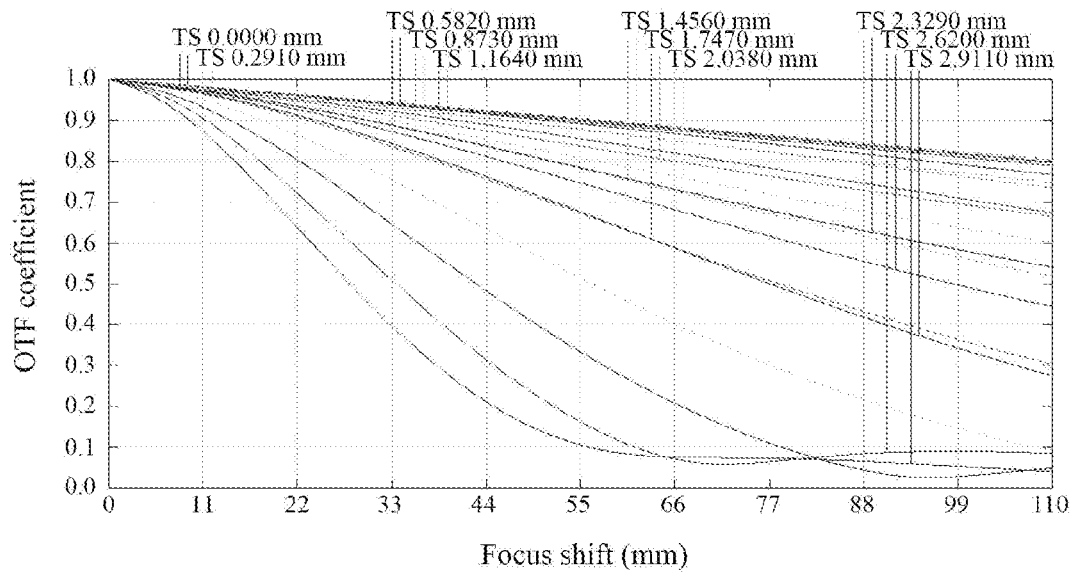
FIG. 25A and FIG. 25B respectively illustrate an MTF curve diagram and a focus shift curve diagram of the optical imaging lens group in Example 5 within a waveband range of 430 nm to 650 nm when a distance from the photographed object to the optical imaging lens group is infinite.
Figure 25B:
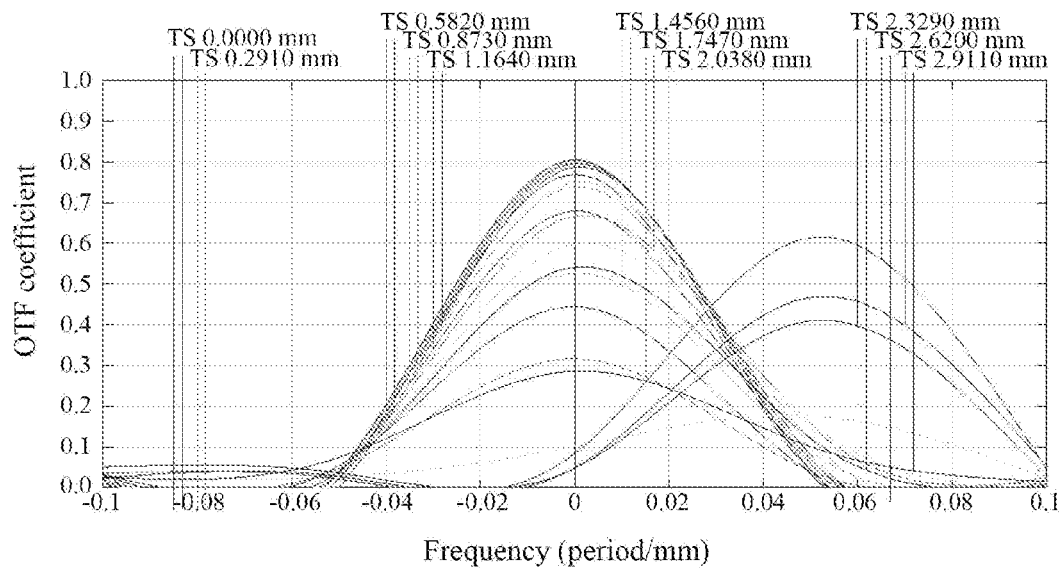

FIG. 22A illustrates the longitudinal aberration curve of the optical imaging lens group according to Example 5, representing deviations of focal points converged by light of different wavelengths after passing through the lens assembly. FIG. 22B illustrates the astigmatic curve of the optical imaging lens group according to Example 5, representing a curvature of a tangential plane and a curvature of a sagittal plane. FIG. 22C illustrates the distortion curve of the optical imaging lens group according to Example 5, representing the amounts of distortion corresponding to different image heights. FIG. 22D illustrates the lateral color curve of the optical imaging lens group according to Example 5, representing deviations of different heights of images on an imaging plane formed by light passing through the lens assembly. FIG. 23A, FIG. 24A and FIG. 25A respectively illustrate MTF curve diagrams of the optical imaging lens group in Example 5 within a waveband range of 430 nm to 650 nm, when the distance from the photographed object to the optical imaging lens group is 350 mm, 150 mm and infinite, representing pixel sizes of a tangential field-of-view and a sagittal field-of-view at different frequencies. FIG. 23B, FIG. 24B and FIG. 25B respectively illustrate focus shift curve diagrams of the optical imaging lens group in Example 5 within a waveband range of 430 nm to 650 nm, when the distance from the photographed object to the optical imaging lens group is 350 mm, 150 mm and infinite, representing pixel sizes of a tangential field-of-view and a sagittal field-of-view under different focal shifts. It can be seen from FIG. 22A to FIG. 25B that the optical imaging lens group provided in Example 5 can achieve good imaging quality.

Example 6

Figure 26:
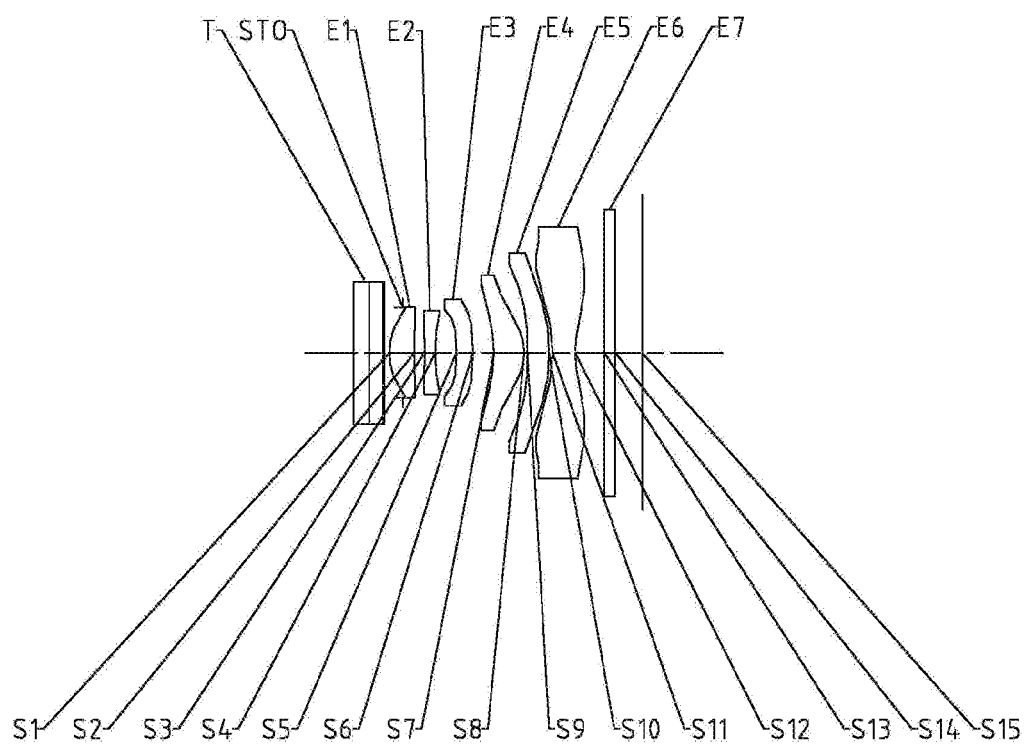
FIG. 26 is a schematic structural diagram illustrating an optical imaging lens group according to Example 6 of the present disclosure.

An optical imaging lens group according to Example 6 of the present disclosure is described below with reference to FIG. 26 to FIG. 30B. FIG. 26 illustrates a schematic structural diagram of the optical imaging lens group according to Example 6 of the present disclosure.

As shown in FIG. 26, the optical imaging lens group from an object side to an image side sequentially includes: an autofocus component T (including a light-transmitting module, a liquid material and a flexible film), a stop STO, a first lens E1, a second lens E2, a third lens E3, a fourth lens E4, a fifth lens E5, a sixth lens E6, an optical filter E7 and an imaging plane S15.

The first lens E1 has a positive refractive power, an object-side surface S1 of the first lens is a convex surface, and an image-side surface S2 of the first lens is a concave surface. The second lens E2 has a negative refractive power, an object-side surface S3 of the second lens is a concave surface, and an image-side surface S4 of the second lens is a concave surface. The third lens E3 has a negative refractive power, an object-side surface S5 of the third lens is a concave surface, and an image-side surface S6 of the third lens is a convex surface. The fourth lens E4 has a positive refractive power, an object-side surface S7 of the fourth lens is a concave surface, and an image-side surface S8 of the fourth lens is a convex surface. The fifth lens E5 has a positive refractive power, an object-side surface S9 of the fifth lens is a concave surface, and an image-side surface S10 of the fifth lens is a convex surface. The sixth lens E6 has a negative refractive power, an object-side surface S11 of the sixth lens is a concave surface, and an image-side surface S12 of the sixth lens is a concave surface. The optical filter E7 has an object-side surface S13 and an image-side surface S14. Light from an object sequentially passes through the light-transmitting module to the image-side surface S14 of the optical filter E7 and is finally imaged on the imaging plane S15.

In this example, a total effective focal length f of the optical imaging lens group is 3.99 mm, a total track length TTL of the optical imaging lens group is 4.83 mm, a half of a diagonal length ImgH of an effective pixel area on the imaging plane S15 of the optical imaging lens group is 3.01 mm, a half of a maximum field-of-view Semi-FOV of the optical imaging lens group is 35.9°, and an F number Fno of the optical imaging lens group is 2.41.

Table 11 is a table illustrating basic parameters of the optical imaging lens group of Example 6, where the units for the radius of curvature, the thickness/distance and the focal length are millimeter (mm). Table 12 shows high-order coefficients applicable to each aspheric surface in Example 6, where the surface shape of each aspheric surface may be defined by the formula (1) given in the above Example 1.

of the optical imaging lens group may be changed with the change of a distance from the photographed object to the optical imaging lens group, thereby realizing the autofocus function of the optical imaging lens group. Specifically, when the distance D1 between the optical imaging lens group and the photographed object is 350 mm, the image-side surface of the autofocus component T is a plane, and the radius of curvature RT is infinite. When the distance D1 between the optical imaging lens group and the photographed object is 150 mm, the image-side surface of the

TABLE 11

| Surface number | Surface type | Radius of curvature | Thickness/ Distance | Material Refractive index | Abbe number | Focal length | Conic coefficient |
|---|---|---|---|---|---|---|---|
| OBJ | Spherical | infinite | D1 | | | | |
| | Spherical | infinite | 0.3000 | 1.52 | 64.2 | | |
| | Spherical | infinite | 0.2650 | 1.55 | 29.9 | | |
| | Spherical | RT | 0.0200 | 1.53 | 65.4 | | |
| | Spherical | | 0.3589 | | | | |
| STO | Spherical | infinite | −0.2589 | | | | |
| S1 | Aspheric | 1.3700 | 0.4760 | 1.55 | 56.1 | 2.75 | 0.0074 |
| S2 | Aspheric | 13.6569 | 0.1923 | | | | 84.4872 |
| S3 | Aspheric | −7.0124 | 0.2100 | 1.67 | 20.4 | −5.81 | 10.0245 |
| S4 | Aspheric | 8.7546 | 0.3994 | | | | −79.9938 |
| S5 | Aspheric | −8.1095 | 0.3169 | 1.64 | 23.5 | −35.44 | 83.4797 |
| S6 | Aspheric | −12.7648 | 0.4000 | | | | 49.9585 |
| S7 | Aspheric | −2.3513 | 0.5800 | 1.55 | 56.1 | 2.43 | −24.6410 |
| S8 | Aspheric | −0.9212 | 0.0600 | | | | −1.0767 |
| S9 | Aspheric | −59.0558 | 0.4100 | 1.55 | 56.1 | 15.36 | 90.0000 |
| S10 | Aspheric | −7.3620 | 0.0728 | | | | 12.8030 |
| S11 | Aspheric | −2.0693 | 0.4300 | 1.54 | 55.8 | −1.93 | −48.3857 |
| S12 | Aspheric | 2.2282 | 0.5564 | | | | −0.7521 |
| S13 | Spherical | infinite | 0.2100 | 1.52 | 64.2 | | |
| S14 | Spherical | infinite | 0.5162 | | | | |
| S15 | Spherical | infinite | | | | | |

In this example, the light-transmitting module and the liquid material may be glued together. By changing the radius of curvature of a flexible film surface of the autofocus component T and the radius of curvature of an image-side surface of the liquid material, the total effective focal length autofocus component T is a concave surface, and the radius of curvature RT is 3.5000. When the distance D1 between the optical imaging lens group and the object is infinite, the image-side surface of the autofocus component T is a convex surface, and the radius of curvature RT is −4.7300.

TABLE 12

| Surface number | A4 | A6 | A8 | A10 | A12 |
|---|---|---|---|---|---|
| S1 | −3.0877E−03 | −3.7795E−03 | −1.6252E−03 | −4.7276E−04 | −1.0462E−04 |
| S2 | −1.7132E−02 | −4.1822E−03 | −1.0833E−03 | −1.1427E−04 | 5.5572E−05 |
| S3 | 4.3228E−02 | 3.1955E−03 | 4.1342E−04 | 1.7791E−04 | 3.2260E−05 |
| S4 | 3.8797E−02 | 2.8996E−03 | 3.0366E−04 | 8.8672E−05 | 2.3846E−05 |
| S5 | −1.1547E−01 | −2.7705E−03 | 8.5777E−05 | 7.5644E−05 | 2.4377E−06 |
| S6 | −1.4414E−01 | 3.6161E−03 | 2.2286E−03 | 1.9675E−04 | 1.4765E−04 |
| S7 | −7.1381E−02 | 2.6604E−02 | −5.8075E−03 | −6.8101E−04 | 1.3683E−03 |
| S8 | 7.8242E−01 | −6.9111E−02 | −4.9608E−02 | −6.0947E−03 | 7.8644E−03 |
| S9 | −3.7740E−01 | 7.3622E−02 | −1.4823E−02 | 6.4722E−03 | −1.1729E−03 |
| S10 | −1.8799E−01 | 1.1813E−01 | −2.6612E−02 | 8.9918E−03 | 9.4677E−04 |
| S11 | −9.3902E−02 | 1.6757E−01 | −6.1983E−02 | 7.7932E−03 | 3.3279E−03 |
| S12 | −2.5078E+00 | 4.9046E−01 | −7.9277E−02 | 1.6229E−02 | 1.2413E−02 |

| Surface number | A14 | A16 | A18 | A20 |
|---|---|---|---|---|
| S1 | 3.2937E−05 | 5.4063E−05 | 6.0910E−05 | 4.7898E−05 |
| S2 | 5.3268E−05 | 2.2423E−05 | −4.6102E−06 | −1.8199E−05 |
| S3 | 3.1897E−05 | 4.3688E−05 | 4.8251E−05 | 4.5919E−05 |
| S4 | 4.6021E−07 | 8.4164E−06 | 1.8298E−06 | 6.3516E−06 |
| S5 | 5.2186E−06 | −1.6310E−05 | 6.6658E−06 | −5.2308E−06 |
| S6 | −6.0528E−06 | −1.1484E−06 | 1.4099E−06 | −1.4665E−06 |
| S7 | −1.4692E−04 | 5.5666E−05 | −9.1470E−06 | −4.4027E−05 |
| S8 | −3.3618E−03 | 1.8781E−03 | −2.9862E−04 | 6.3811E−04 |
| S9 | −1.4577E−03 | 1.1339E−03 | −1.5030E−03 | 1.0119E−03 |

TABLE 12-continued

| | | | | |
|---|---|---|---|---|
| S10 | −3.3754E−05 | −7.3190E−04 | −1.2895E−03 | 5.4966E−04 |
| S11 | −6.0312E−03 | 3.5825E−03 | −7.0137E−04 | −8.6299E−04 |
| S12 | 3.2152E−03 | 2.9986E−03 | −7.9674E−03 | 3.0349E−03 |

Figure 27A:
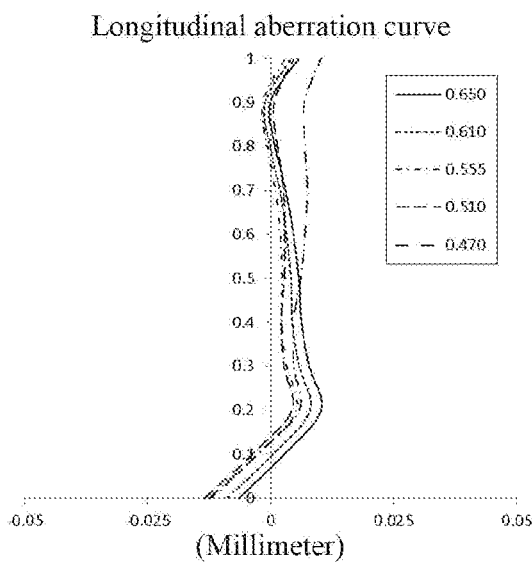
FIGS. 27A-27D respectively illustrate a longitudinal aberration curve, an astigmatic curve, a distortion curve and a lateral color curve of the optical imaging lens group according to Example 6.
Figure 27B:
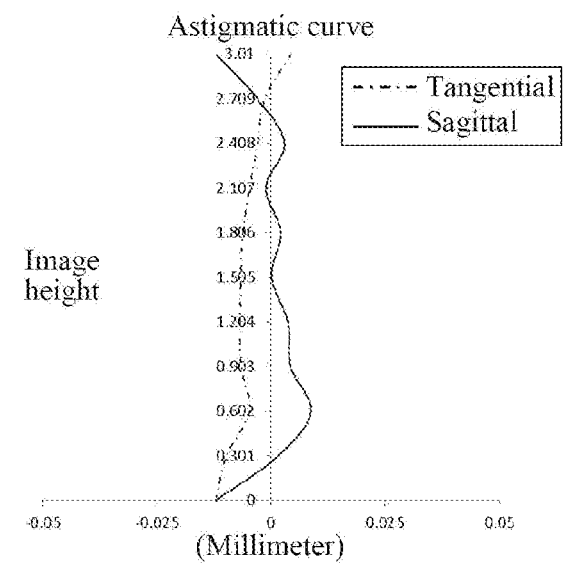
Figure 27C:
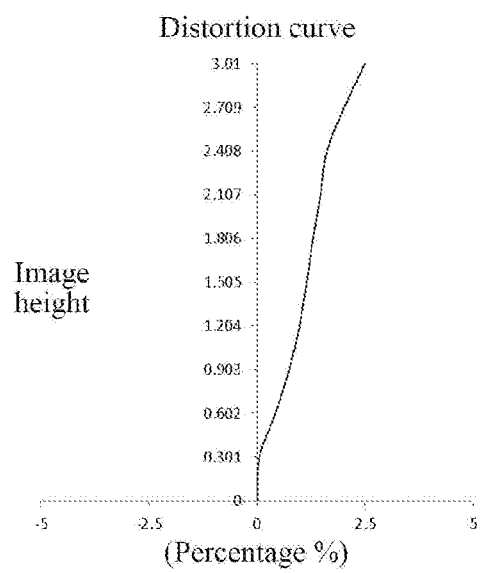
Figure 27D:
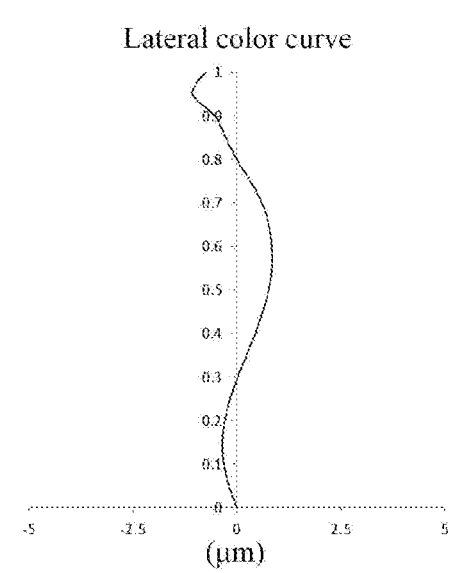
Figure 28A:
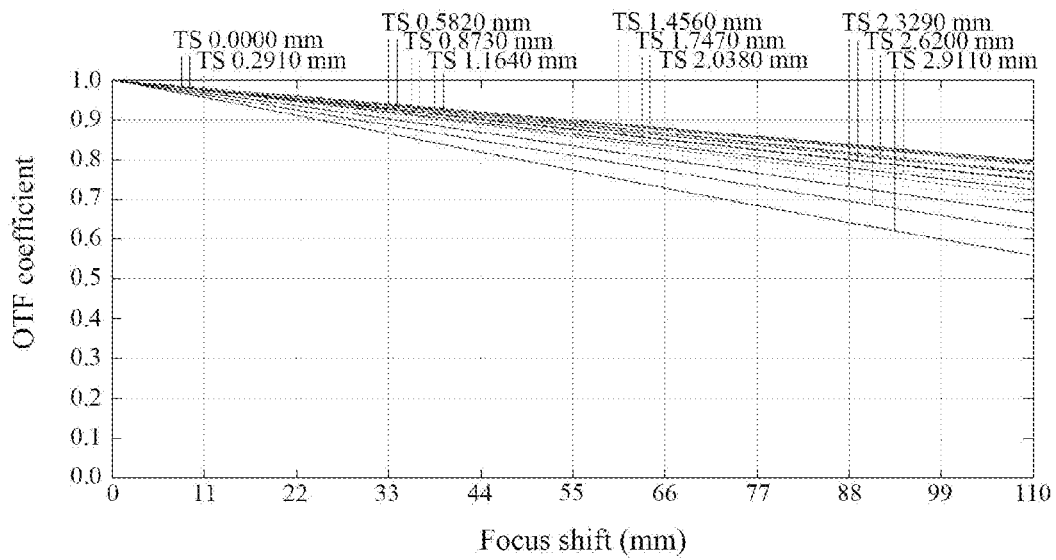
FIG. 28A and FIG. 28B respectively illustrate a modulation transfer function (MTF) curve diagram and a focus shift curve diagram of the optical imaging lens group in Example 6 within a waveband range of 430 nm to 650 nm when a distance from the photographed object to the optical imaging lens group is 350 mm.
Figure 28B:
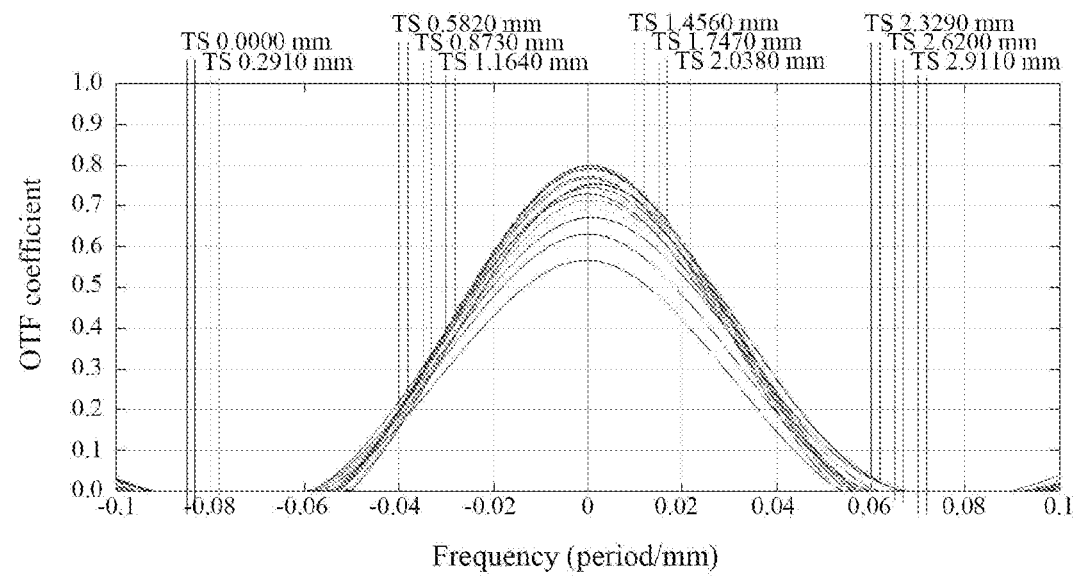
Figure 29A:
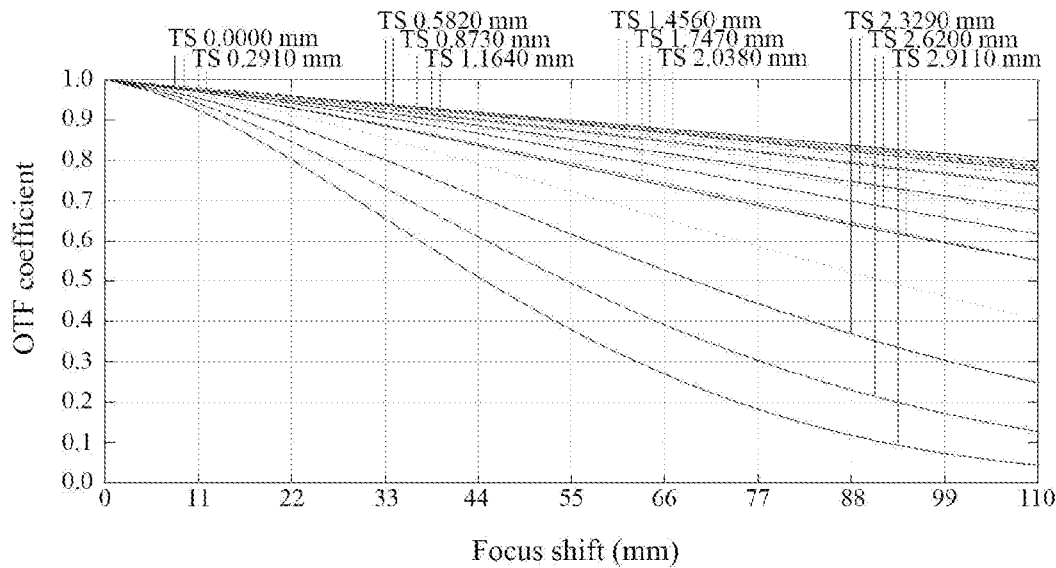
FIG. 29A and FIG. 29B respectively illustrate an MTF curve diagram and a focus shift curve diagram of the optical imaging lens group in Example 6 within a waveband range of 430 nm to 650 nm when a distance from the photographed object to the optical imaging lens group is 150 mm.
Figure 29B:
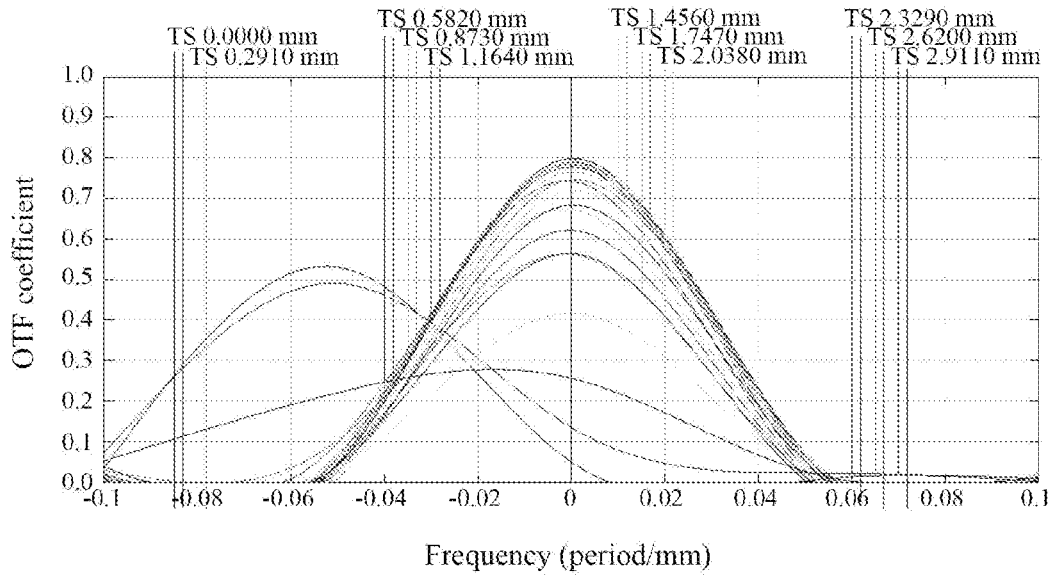
Figure 30A:
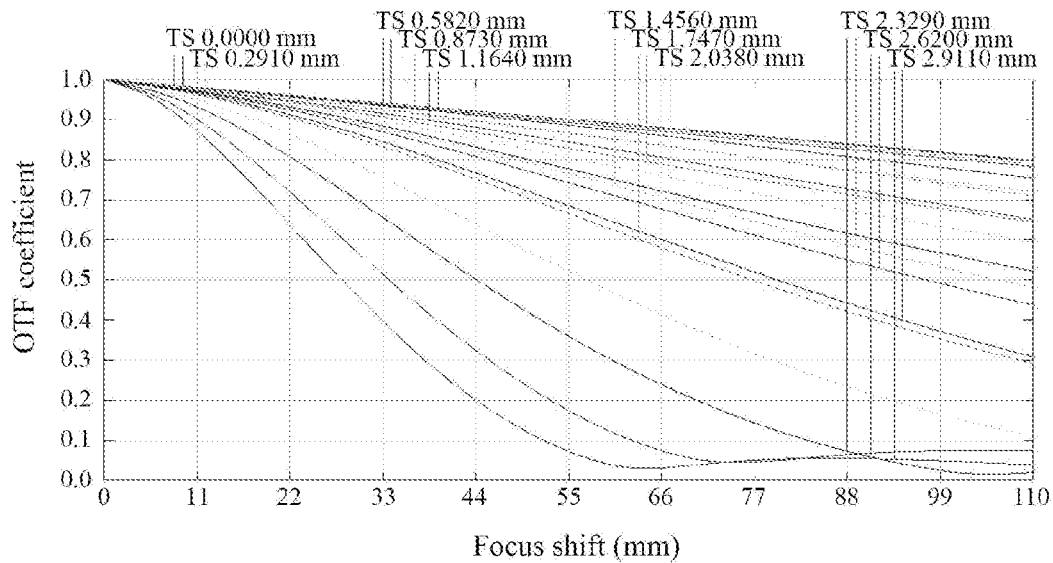
FIG. 30A and FIG. 30B respectively illustrate an MTF curve diagram and a focus shift curve diagram of the optical imaging lens group in Example 6 within a waveband range of 430 nm to 650 nm when a distance from the photographed object to the optical imaging lens group is infinite.
Figure 30B:
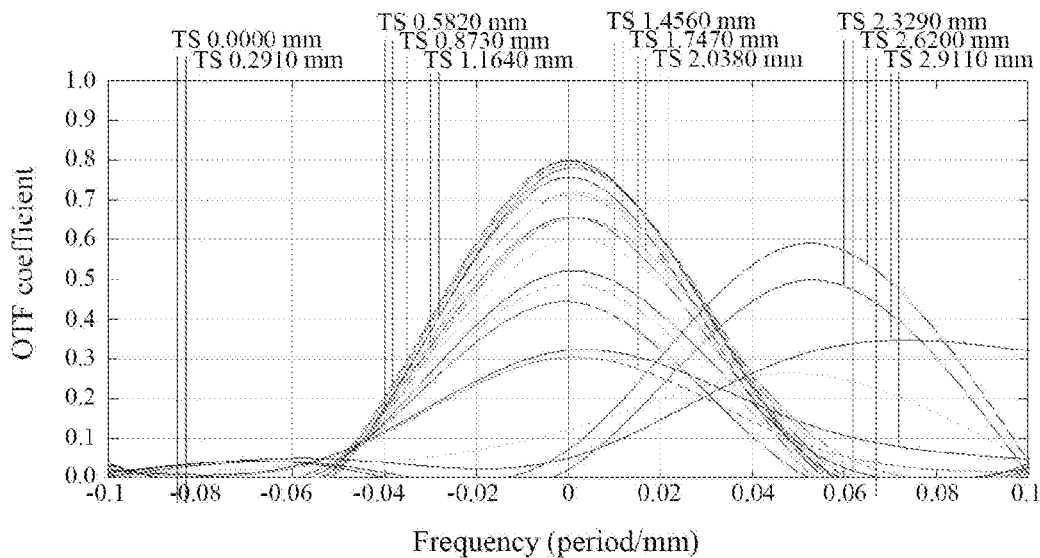

FIG. 27A illustrates the longitudinal aberration curve of the optical imaging lens group according to Example 6, representing deviations of focal points converged by light of different wavelengths after passing through the lens assembly. FIG. 27B illustrates the astigmatic curve of the optical imaging lens group according to Example 6, representing a curvature of a tangential plane and a curvature of a sagittal plane. FIG. 27C illustrates the distortion curve of the optical imaging lens group according to Example 6, representing the amounts of distortion corresponding to different image heights. FIG. 27D illustrates the lateral color curve of the optical imaging lens group according to Example 6, representing deviations of different heights of images on an imaging plane formed by light passing through the lens assembly. FIG. 28A, FIG. 29A and FIG. 30A respectively illustrate MTF curve diagrams of the optical imaging lens group in Example 6 within a waveband range of 430 nm to 650 nm, when the distance from the photographed object to the optical imaging lens group is 350 mm, 150 mm and infinite, representing pixel sizes of a tangential field-of-view and a sagittal field-of-view at different frequencies. FIG. 28B, FIG. 29B and FIG. 30B respectively illustrate focus shift curve diagrams of the optical imaging lens group in Example 6 within a waveband range of 430 nm to 650 nm, when the distance from the photographed object to the optical imaging lens group is 350 mm, 150 mm and infinite, representing pixel sizes of a tangential field-of-view and a sagittal field-of-view under different focal shifts. It can be seen from FIG. 27A to FIG. 30B that the optical imaging lens group provided in Example 6 can achieve good imaging quality.

In view of the above, examples 1 to 6 respectively satisfy the relationship shown in Table 13.

TABLE 13

| | Example | | | | | |
|---|---|---|---|---|---|---|
| Conditional | 1 | 2 | 3 | 4 | 5 | 6 |
| ΣCT/D | 3.77 | 4.18 | 4.07 | 4.23 | 4.52 | 4.14 |
| TTL/ΣAT | 3.52 | 4.13 | 4.10 | 4.40 | 4.40 | 4.30 |
| f2/f1 | −1.46 | −2.20 | −1.79 | −2.23 | −2.34 | −2.11 |
| f4/f | 0.49 | 0.52 | 0.53 | 0.61 | 0.62 | 0.61 |
| f/ImgH | 1.37 | 1.39 | 1.41 | 1.32 | 1.40 | 1.32 |
| R2/R3 | −3.97 | −5.34 | −2.66 | −2.31 | −1.46 | −1.95 |
| f1/R1 | 1.91 | 1.96 | 2.02 | 1.98 | 2.03 | 2.01 |
| R7/R8 | 6.04 | 5.03 | 5.66 | 2.47 | 2.71 | 2.55 |
| CT1/T12 | 3.26 | 3.49 | 3.27 | 3.05 | 3.51 | 2.47 |
| T23/T12 | 1.70 | 1.89 | 1.70 | 2.46 | 3.14 | 2.08 |
| CT4/T34 | 1.00 | 1.80 | 1.62 | 1.45 | 1.53 | 1.45 |

The present disclosure further provides an imaging apparatus, having an electronic photosensitive element, which may be a photosensitive Charge-Coupled Device (CCD) or a Complementary Metal-Oxide Semiconductor (CMOS). The imaging apparatus may be an independent imaging device such as a digital camera, or may be an imaging module integrated in a mobile electronic device such as a mobile phone. The imaging apparatus is equipped with the optical imaging lens group described above.

The foregoing is only a description of the preferred examples of the present disclosure and the applied technical principles. It should be appreciated by those skilled in the art that the inventive scope of the present disclosure is not limited to the technical solutions formed by the particular combinations of the above technical features. The inventive scope should also cover other technical solutions formed by any combinations of the above technical features or equivalent features thereof without departing from the concept of the invention, such as, technical solutions formed by replacing the features as disclosed in the present disclosure with (but not limited to), technical features with similar functions.

What is claimed is:

1. An optical imaging lens group, along an optical axis from an object side to an image side sequentially comprising: an autofocus component, a first lens, a second lens, a third lens, a fourth lens, and at least one subsequent lens, wherein,
a radius of curvature of an image-side surface of the autofocus component is variable; and
there is an interval between each two adjacent lenses among the first lens to the at least one subsequent lens, wherein a total effective focal length f of the optical imaging lens group and an effective focal length f4 of the fourth lens satisfy: 0<f4/f<0.62,
wherein a spaced interval T12 between the first lens and the second lens on the optical axis and a spaced interval T23 between the second lens and the third lens on the optical axis satisfy: 1.7<T23/T12<2.08.

2. The optical imaging lens group according to claim 1, wherein an effective focal length f1 of the first lens and an effective focal length f2 of the second lens satisfy: −2.5<f2/f1<−1.0.

3. The optical imaging lens group according to claim 1, wherein a radius of curvature R2 of an image-side surface of the first lens and a radius of curvature R3 of an object-side surface of the second lens satisfy: −5.5<R2/R3<−1.0.

4. The optical imaging lens group according to claim 1, wherein an effective focal length f1 of the first lens and a radius of curvature R1 of an object-side surface of the first lens satisfy: 1.5<f1/R1<2.1.

5. The optical imaging lens group according to claim 1, wherein a radius of curvature R7 of an object-side surface of the fourth lens and a radius of curvature R8 of an image-side surface of the fourth lens satisfy: 2.0<R7/R8<6.1.

6. The optical imaging lens group according to claim 1, wherein a center thickness CT1 of the first lens on the optical axis and a spaced interval T12 between the first lens and the second lens on the optical axis satisfy: 2.0<CT1/T12<3.6.

7. The optical imaging lens group according to claim 1, wherein a center thickness CT4 of the fourth lens on the optical axis and a spaced interval T34 between the third lens and the fourth lens on the optical axis satisfy: 1.0<CT4/T34<2.0.

8. The optical imaging lens group according to claim 1, wherein a half of a maximum field-of-view of the optical imaging lens group Semi-FOV satisfies: Semi-FOV>30°.

9. The optical imaging lens group according to claim 1, wherein a sum of center thickness ΣCT of the first lens to a lens closest to the image side on the optical axis and a center thickness D of the autofocus component on the optical axis satisfy: 3.5<ΣCT/D<4.6.

10. The optical imaging lens group according to claim 1, wherein a distance TTL from the object-side surface of the first lens to an imaging plane of the optical imaging lens group on the optical axis and a sum of spaced intervals ΣAT of each two adjacent lenses on the optical axis among the first lens to a lens closest to the image side satisfy: 3.5<TTL/ΣAT<4.5.

11. The optical imaging lens group according to claim 1, wherein a total effective focal length f of the optical imaging lens group and a half of a diagonal length ImgH of an effective pixel area on an imaging plane of the optical imaging lens group satisfy: 1.0<f/ImgH<1.5.

12. The optical imaging lens group according to claim 1, wherein the autofocus component along the optical axis from the object side sequentially comprises: a light-transmitting module, a liquid material, and a flexible film, wherein,
   the liquid material is glued to the light-transmitting module;
   the flexible film is disposed on an image-side surface of the liquid material; and
   a radius of curvature of the image-side surface of the liquid material and a shape of the flexible film are variable.

13. The optical imaging lens group according to claim 1, wherein an effective focal length f1 of the first lens and a radius of curvature R1 of an object-side surface of the first lens satisfy: 1.8<f1/R1<2.1.

14. The optical imaging lens group according to claim 2, wherein the effective focal length f1 of the first lens and the effective focal length f2 of the second lens satisfy: −1.79<f2/f1<−1.0.

15. The optical imaging lens group according to claim 4, wherein the effective focal length f1 of the first lens and the radius of curvature R1 of the object-side surface of the first lens satisfy: 1.91<f1/R1<2.1.

16. The optical imaging lens group according to claim 5, wherein the radius of curvature R7 of the object-side surface of the fourth lens and the radius of curvature R8 of the image-side surface of the fourth lens satisfy: 5.03<R7/R8<6.1.

17. The optical imaging lens group according to claim 6, wherein the center thickness CT1 of the first lens on the optical axis and the spaced interval T12 between the first lens and the second lens on the optical axis satisfy: 2.0<CT1/T12<3.05.

* * * * *